(12) United States Patent
Nagata

(10) Patent No.: US 9,858,513 B2
(45) Date of Patent: Jan. 2, 2018

(54) DOCUMENT FILE OUTPUT APPARATUS, DOCUMENT FILE OUTPUT METHOD, AND COMPUTER READABLE MEDIUM

(75) Inventor: Yoshinori Nagata, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 161 days.

(21) Appl. No.: 14/353,819

(22) PCT Filed: Aug. 20, 2012

(86) PCT No.: PCT/JP2012/070962
§ 371 (c)(1),
(2), (4) Date: Apr. 24, 2014

(87) PCT Pub. No.: WO2013/061674
PCT Pub. Date: May 2, 2013

(65) Prior Publication Data
US 2014/0293353 A1  Oct. 2, 2014

(30) Foreign Application Priority Data
Oct. 26, 2011  (JP) .................................. 2011-235396

(51) Int. Cl.
*G06F 3/12* (2006.01)
*G06K 15/02* (2006.01)
(Continued)

(52) U.S. Cl.
CPC ..... *G06K 15/1894* (2013.01); *H04N 1/32101* (2013.01); *H04N 1/33315* (2013.01);
(Continued)

(58) Field of Classification Search
None
See application file for complete search history.

(56) References Cited

U.S. PATENT DOCUMENTS 4,881,270 A * 11/1989 Knecht et al. ................ 382/191
5,892,591 A *  4/1999 Anglin et al. ................ 358/407
(Continued)

FOREIGN PATENT DOCUMENTS

| JP | 2000-354144 A | 12/2000 |
| JP | 2002-312385 A | 10/2002 |

(Continued)

OTHER PUBLICATIONS

Official Communication issued in International Patent Application No. PCT/JP2012/070962, dated Nov. 20, 2012.

*Primary Examiner* — John Wallace
(74) *Attorney, Agent, or Firm* — Keating & Bennett, LLP

(57) ABSTRACT

Provided is a document file output apparatus capable of appropriately storing each document as different files depending on a difference in printing setting, even when printed materials which are to be different documents for each single sheet or every plurality of sheets are continuously read, a document file output method, and a computer readable medium storing a program for operating a computer as the document file output apparatus. The document file output apparatus each specifies the printing setting of each read printed material, for example, a layout, a difference in a size of the read printed material, presence or absence of framework printing, presence or absence of reduction printing, color/monochromatic setting, or image embedding, from the obtained image data, and outputs by dividing the document files before and after the read printed material in which the printing setting is changed.

7 Claims, 21 Drawing Sheets

(51) Int. Cl.
*H04N 1/46* (2006.01)
*H04N 1/32* (2006.01)
*H04N 1/333* (2006.01)

(52) U.S. Cl.
CPC ....... *H04N 1/46* (2013.01); *H04N 2201/3242* (2013.01); *H04N 2201/33321* (2013.01); *H04N 2201/33378* (2013.01)

(56) References Cited

U.S. PATENT DOCUMENTS

| 8,305,632 | B2* | 11/2012 | Johnson | H04N 1/00209 358/1.6 |
| 8,731,297 | B1* | 5/2014 | Zhou et al. | 382/180 |
| 8,838,591 | B2* | 9/2014 | Hull et al. | 707/736 |
| 2005/0246631 | A1* | 11/2005 | Mori et al. | 715/515 |
| 2005/0275871 | A1* | 12/2005 | Baird et al. | 358/1.15 |
| 2008/0174790 | A1 | 7/2008 | Noguchi et al. | |
| 2009/0045249 | A1* | 2/2009 | Miyasake | H04N 1/00352 235/375 |
| 2009/0290883 | A1* | 11/2009 | Nakahara | 399/27 |
| 2010/0017705 | A1* | 1/2010 | Sato | 715/243 |
| 2010/0231961 | A1* | 9/2010 | Fukushima | 358/1.15 |
| 2010/0246947 | A1* | 9/2010 | Ma | 382/167 |
| 2010/0329575 | A1* | 12/2010 | Scalise et al. | 382/218 |

FOREIGN PATENT DOCUMENTS

| JP | 2004-304546 A | 10/2004 |
| JP | 2006-72484 A | 3/2006 |
| JP | 2008-176557 A | 7/2008 |
| JP | 2009-169675 A | 7/2009 |
| JP | 2010-198257 A | 9/2010 |
| JP | 2011-066820 A | 3/2011 |

\* cited by examiner

DOCUMENT FILE OUTPUT APPARATUS, DOCUMENT FILE OUTPUT METHOD, AND COMPUTER READABLE MEDIUM

This application is the national phase under 35 U.S.C. §371 of PCT International Application No. PCT/JP2012/070962 which has an International filing date of Aug. 20, 2012 and designated the United States of America.

BACKGROUND OF THE INVENTION

1. Field of the Invention

The present invention relates to a document file output apparatus which reads an image from a printed material and outputs the read image data as a document file. More particularly, the present invention relates to a document file output apparatus, a document file output method and a computer readable medium on which a program that are capable of appropriately outputting each document as different files depending on a difference in printing setting, even when printed materials which are to be different documents for each single sheet or every plurality of sheets are continuously read.

2. Description of Related Art

Recently, documents or graphics are written and recorded as digital data and thus may be generally used by being printed on media such as paper and cloth only in necessary scenes. The recording of documents on an electronic recording medium allows resources such as paper and cloth to be saved and a space to be conserved for an enormous amount of information.

Specifically, a recent improvement of reproducibility of an image reading technique and a printing technique and a downsizing of a recording medium, realizing a reading as image data text, graphics, etc., which are traditionally recorded and stored on media such as paper and cloth by using an image reading apparatus and a converting to digital data.

The image reading apparatus includes an automatic document feeder and uses a method for automatically reading continuously a plurality of printing media placed on the automatic document feeder and recording the continuously read image data as separate files for each content using a prescribed manner.

Thereby, a user needs not perform separate operation to read different documents or execute reading for every graphic. Even though the user collects printing media on which different documents or graphics are printed, places the media on the automatic document feeder of the image reading apparatus, and finishes an operation to execute reading at a time, it is possible to convert an individual document or graphic into digital data as a different file.

For example, a conventional image processing apparatus detects special paper, called a separator, from paper which have a plurality of documents or graphics each printed thereon and are placed on the automatic document feeder of the image read unit, and stores before and after the separator as different files.

Further, an another conventional image reading apparatus extracts features of a printed material whenever the image data are continuously read from the printed material and separately accumulates the document when the extracted features are changed. Conventional technique proposes the following examples of the features of the printed material, a size of a character, a character spacing, a line spacing, a margin, a difference in vertical writing/horizontal writing, presence or absence of multi-columns, a difference in original direction, a difference in character region/image region, keywords described on the printed material, continuity of serial number, presence or absence of a mark, presence or absence of a specific color, presence or absence of exclusive paper (separator) or the like.

SUMMARY OF THE INVENTION

However, the conventional techniques is used, sometimes it may be insufficient to reduce a workload of the user.

The conventional image processing apparatus using special paperstill requires an operation wherein the user inserts the special paper.

Recently, a printing apparatus has improved printing functions, and perform printing by setting multiple pages on one sheet of printing medium and output the sheet at the time of printing. Further, although a printed paper has color image, the printing apparatus may also perform printing in black and white. The another conventional image reading apparatus reads each page as a single image data to extract various features, however, has not given consideration for an extraction differences in printing settings as a feature of a printed material.

The present invention has been made in view of the circumstances described above, and has an object to provide a document file output apparatus, a document file output method and a computer readable medium storing a program that are capable of appropriately outputting each document as different files depending on a difference in printing setting, even when printed materials which are to be different documents for each single sheet or every plurality of sheets are continuously read.

According to the present invention, since the printing setting of each read printed material may be specified, it is possible to appropriately store each document as different files depending on a difference in various printing setting for each document.

DETAILED DESCRIPTION

Hereinafter, the present invention will be described in detail with reference to the accompanying drawings illustrating embodiments thereof.

Embodiment 1

Figure 1:
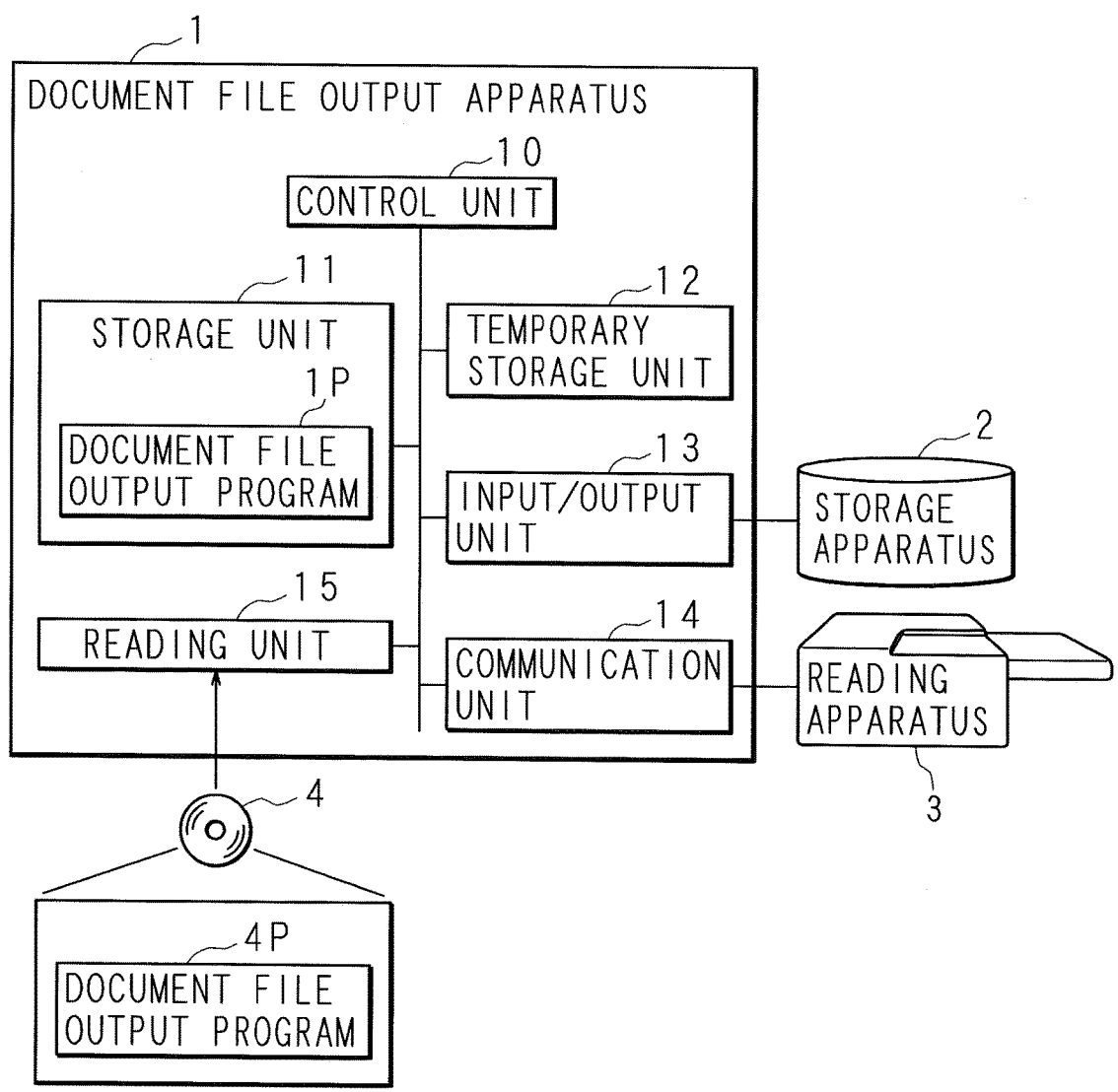
FIG. 1 is a block diagram illustrating a configuration of a document file output system according to Embodiment 1.

FIG. 1 is a block diagram illustrating a configuration of a document file output system according to Embodiment 1. The document file output system according to Embodiment 1 includes a document file output apparatus 1, a storage apparatus 2, and a reading apparatus 3.

The reading apparatus 3 is a scanner using a charge coupled device (CCD) image sensor and the like. The reading apparatus 3 includes an automatic document feeder which automatically takes in a plurality of printed papers placed on a document platen sheet by sheet. When the printed papers are placed on the document platen of the automatic document feeder and a user performs an operation of read start, the reading apparatus 3 takes in all the printed papers placed on the document platen sheet by sheet and reads images from one side or both sides of the printed paper. The reading apparatus 3 temporarily stores the read images in an embedded storage unit in a read order, as analog image data or digital image data, or sequentially outputs the stored images to the document file output apparatus 1.

As the storage apparatus 2, storage media such as a hard disk drive and a solid state drive (SSD) is used. The storage apparatus 2 stores data of a document file which are output from the document file output apparatus 1.

A personal computer is used for the document file output apparatus 1. The document file output apparatus 1 includes a control unit 10, a storage unit 11, a temporary storage unit 12, an input/output unit 13, a communication unit 14, and a reading unit 15.

A central processing unit (CPU) is user for the control unit 10. The control unit 10 reads and executes a document file output program 1P stored in the storage unit 11 from the temporary storage unit 12, then the personal computer functions as the document file output apparatus.

A hard disk is used for the storage unit 11. As the storage unit 11, the SSD, a flash memory, and the like may be used. The storage unit 11 stores the above-described document file output program 1P. Further, the storage unit 11 stores image data obtained by the communication unit 14, information used at the time of calculation by the control unit 10, and data of the document file which is to be output from the control unit 10.

RAM such as a static random access memory (SRAM) and a dynamic random access memory (DRAM) is used for the temporary storage unit 12. The temporary storage unit 12 temporarily stores information generated by the processing of the control unit 10, for example, pixel data which are being processed, information extracted from image data and the like.

The input/output unit 13 is, for example, a universal serial bus (USB) interface. The input/output unit 13 is connected to the storage apparatus 2 and transmits the data of the document file output from the control unit 10 to the storage apparatus 2. The input/output unit 13 may be connected to another reading apparatus corresponding to the USB connection. In this case, the control unit 10 obtains the image data from another reading apparatus through the input/output unit 13. Further, the input/output unit 13 is not limited to the USB and may be connected to external apparatuses, such as the storage device and the reading apparatus, based on another communication protocol.

The communication unit 14 is, for example, a local area network (LAN) interface. The communication unit 14 transmits and receives information through the LAN based on a prescribed communication protocol. The control unit 10 receives and obtains the image data which are transmitted from the reading apparatus 3 through the communication unit 14. The communication unit 14 may be connected to another storage device on the same network having a communication function. In this case, the control unit 10 transmits the data of the document file to be output from the communication unit 14 to another storage device.

A disk driver is used for the reading unit 15. The reading unit 15 reads information which is recorded in recording media 4 such as a compact disk (CD), a digital versatile disk (DVD), a blu-ray (registered mark) disk (BD), a flash memory, and a flexible disk. A document file output program 4P is recorded in the recording medium 4 according to the present embodiment. The control unit 10 reads the information recorded in the recording medium 4 by the reading unit 15 and stores the read information in the storage unit 11 or the temporary storage unit 12. The document file output program 1P which is stored in the storage unit 11 may be a copy of the document file output program 4P which is read from the recording medium 4.

Figure 2:
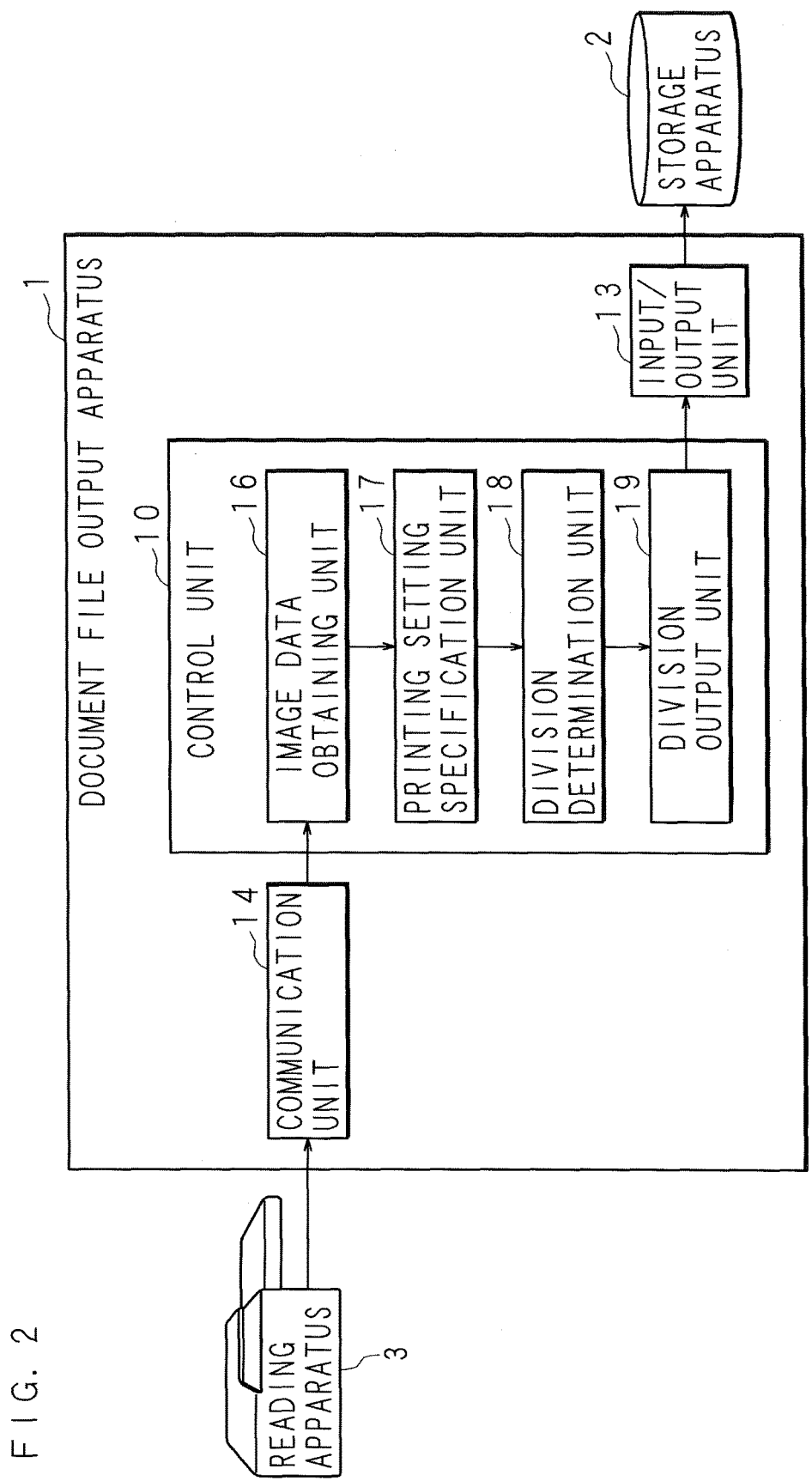
FIG. 2 is a functional block diagram illustrating a function which is implemented in a document file output apparatus according to Embodiment 1.

FIG. 2 is a functional block diagram illustrating a function which is implemented in the document file output apparatus 1 according to Embodiment 1. The control unit 10 of the document file output apparatus 1 reads and executes the document file output program 1P which is stored in the storage unit 11, and thus serves as an image data obtaining unit 16, a printing setting specification unit 17, a division determination unit 18, and a division output unit 19. Further, each function may be implemented in hardware as a specific integrated circuit, respectively.

In the document file output apparatus 1 having the above-described configuration, the control unit 10 obtains a series of image data which are read and output from a printed paper by the reading apparatus 3 by using the function of the image data obtaining unit 16 and stores the obtained data in the temporary storage unit 12 or the storage unit 11. Further, the control unit 10 processes each of the obtained and stored image data in a read order by using the function of the printing setting specification unit 17 to specify printing setting. The control unit 10 determines whether the printing setting is changed using the function of the division determination unit 18, based on the printing setting which is specified for the image data of each printed paper. The control unit 10 stores up to the image data, for which it is determined that the printing setting is changed, in the storage unit 11 as one document file by using the function of the division output unit 19. The document file output apparatus 1 outputs each document file stored in the storage unit 11 from the input/output unit 13 to the storage apparatus 2.

Figure 3:
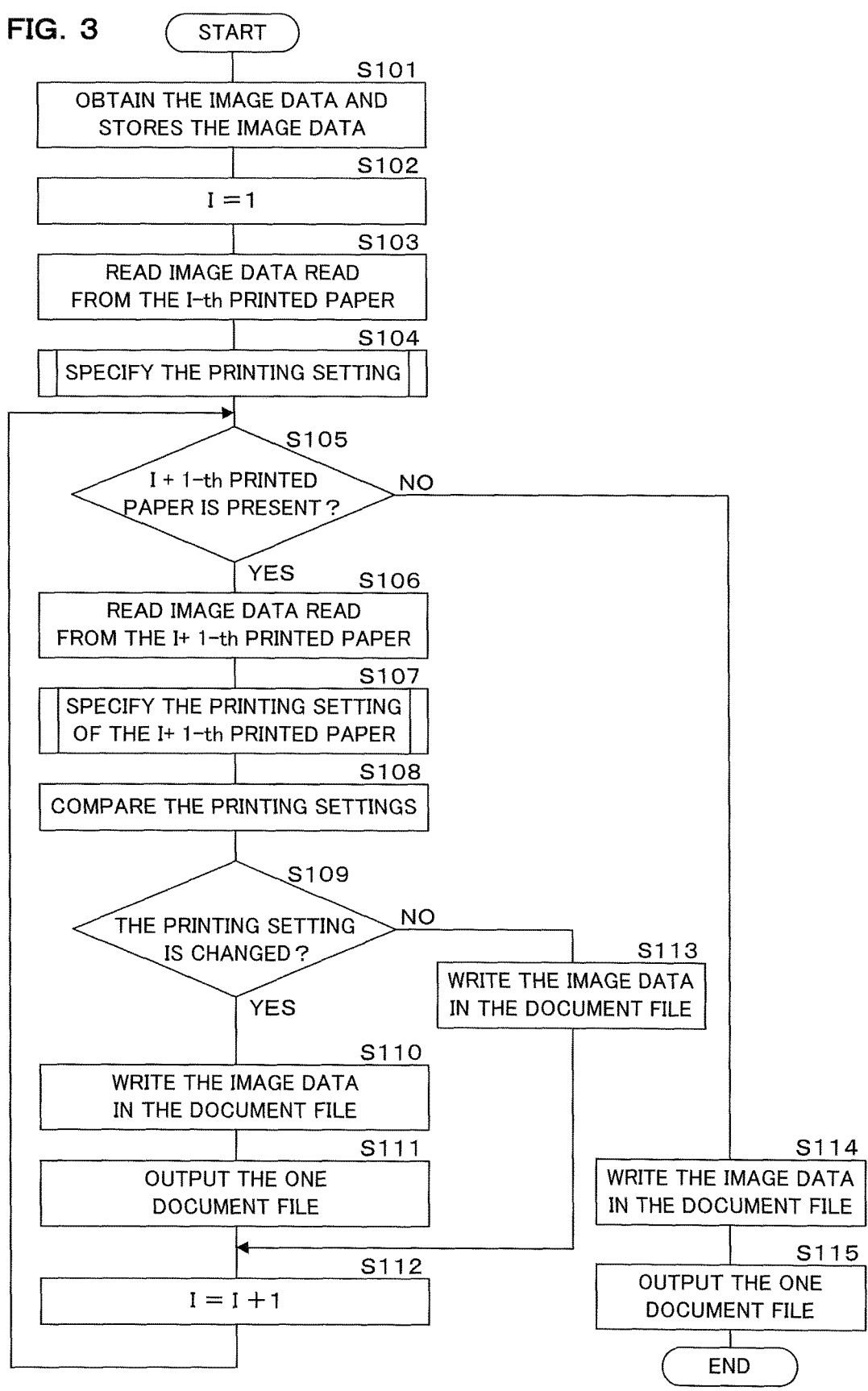
FIG. 3 is a flow chart illustrating an example of a processing procedure executed by a control unit of the document file output apparatus according to Embodiment 1.

FIG. 3 is a flow chart illustrating an example of a processing procedure executed by the control unit 10 of the document file output apparatus 1 according to Embodiment 1.

The control unit 10 obtains the image data, which are output from the reading apparatus 3, by using the function of the image data obtaining unit 16, and stores the obtained image data in the temporary storage unit 12 or the storage unit 11 (step S101).

The control unit 10 substitutes 1 into a variable I, in association with an order in which the printed paper is read, by using the function of the printing setting specification unit 17 (step S102). The control unit 10 reads image data of a printed paper read in the I-th among the image data stored in the temporary storage unit 12 or the storage unit 11 (step S103). The control unit 10 specifies the printing setting of the I-th printed paper based on the image data of an I (I=1)-th printed paper, by using the function of the printing setting specification unit 17 (step S104).

Next, the control unit 10 determines whether an I+1-th printed paper is present (step S105). When it is determined that the I+1-th printed paper is present (YES in S105), the control unit 10 reads image data of a printed paper read in the I+1-th from the storage unit 11 (step S106). The control unit 10 specifies the printing setting of the I+1-th printed paper based on the read image data (step S107).

The control unit 10 compares the printing setting of the I-th printed paper which is specified in advance with the printing setting of the I+1-th printed paper specified in step S107 (step S108) by using the function of the division determination unit 18 to determine whether the printing setting is changed (step S109). When the control unit 10 determines that the printing setting is changed by the function of the division determination unit 18 (YES in S109), the control unit 10 writes the image data of the I-th printed paper in the document file to be output, by using the function of the division output unit 19 (step S110). Next, the control unit 10 brings one document file completion up to the I-th image data, closes the file and output (step S111). The control unit 10 adds 1 to the variable I (step S112), returns the processing to step S105, and repeats the above-described process up to the final read printed material.

When the control unit 10 determines that the printing setting is not changed in step S109 (NO in S109), the control unit 10 writes the image data of the I-th printed paper in the document file to be output, by using the function of the division output unit 19 (step S113), and progresses the processing to step S112.

The processing ends on the image data of all the read originals, and thus when the control unit 10 determines that the I+1-th printed paper is not present (NO in S105), the control unit 10 writes the image data of the I-th printed paper in the document file to be output by using the function of the division output unit 19 (step S114). Next, the image data up to the I-th printed paper are completed as one document file and thus the file is closed and output (step S115) and the processing ends.

Figure 4:
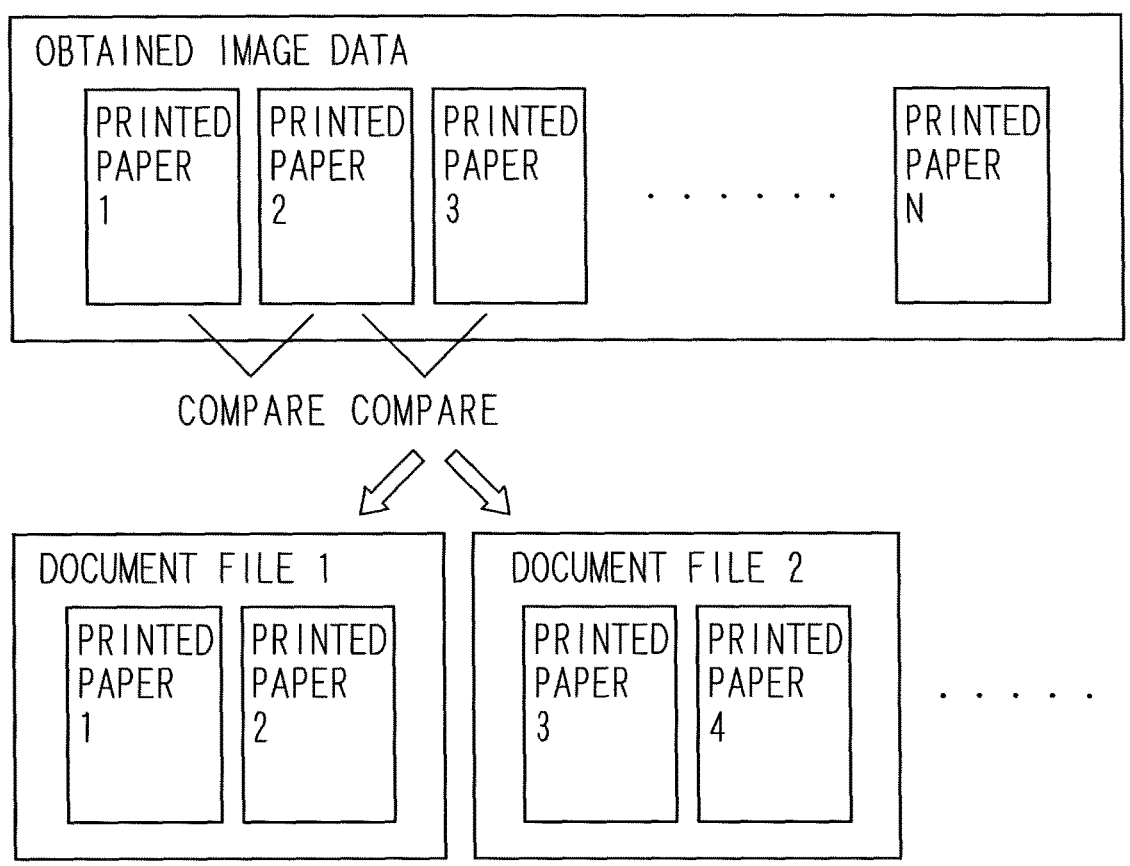
FIG. 4 is an image diagram of processing of dividing image data obtained by the document file output apparatus according to Embodiment 1 into a document file.

FIG. 4 is an image diagram of processing of dividing the image data obtained by the document file output apparatus 1 according to Embodiment 1 into the document file. The image data, which are output from the reading apparatus 3 and obtained by the document file output apparatus 1, is shown at an upper part, and the image of the document files, which are dividedly output by the document file output apparatus 1, is shown at a lower part.

The control unit 10 executes the processing as illustrated in a flow chart of FIG. 3 to read the obtained image data in a read order, for example read printed paper 1→printed paper 2→printed paper 3, . . . , and printed paper N in this order. The control unit 10 compares the printing setting specified from the image data of each original with printed papers 1 and 2, printed papers 2 and 3, . . . . Further, if it is determined that the printing setting is changed as a comparison result of the printing setting of printed paper 3 with the printing setting of printed paper 2 for example, the control unit 10 outputs the image data up to printed paper 2, that is, the image data of printed papers 1 and 2 as one document file. The control unit 10 repeatedly executes such a processing on the final printed paper N to be able to output by appropriately dividing the image data into each document file.

Further, in the processing procedure illustrated in FIG. 3 and description of FIG. 4, the control unit 10 obtains read printed paper 1→printed paper 2→printed paper 3, . . . , and printed paper N in this order, specifies the printing settings one by one, and then compare the specified printing setting with the printing setting of the previous printed paper. However, the present invention is not limited thereto, and may obtain read printed paper N→printed paper N−1, . . . , in this order. Further, the control unit 10 may specify the printing setting of all the printed papers in advance based on the image data of all the printed papers obtained as illustrated in FIG. 4, specify what number of the printed paper in which the printing setting is changed, and then output by dividing the document files before and after the specified printed paper.

Figure 5:
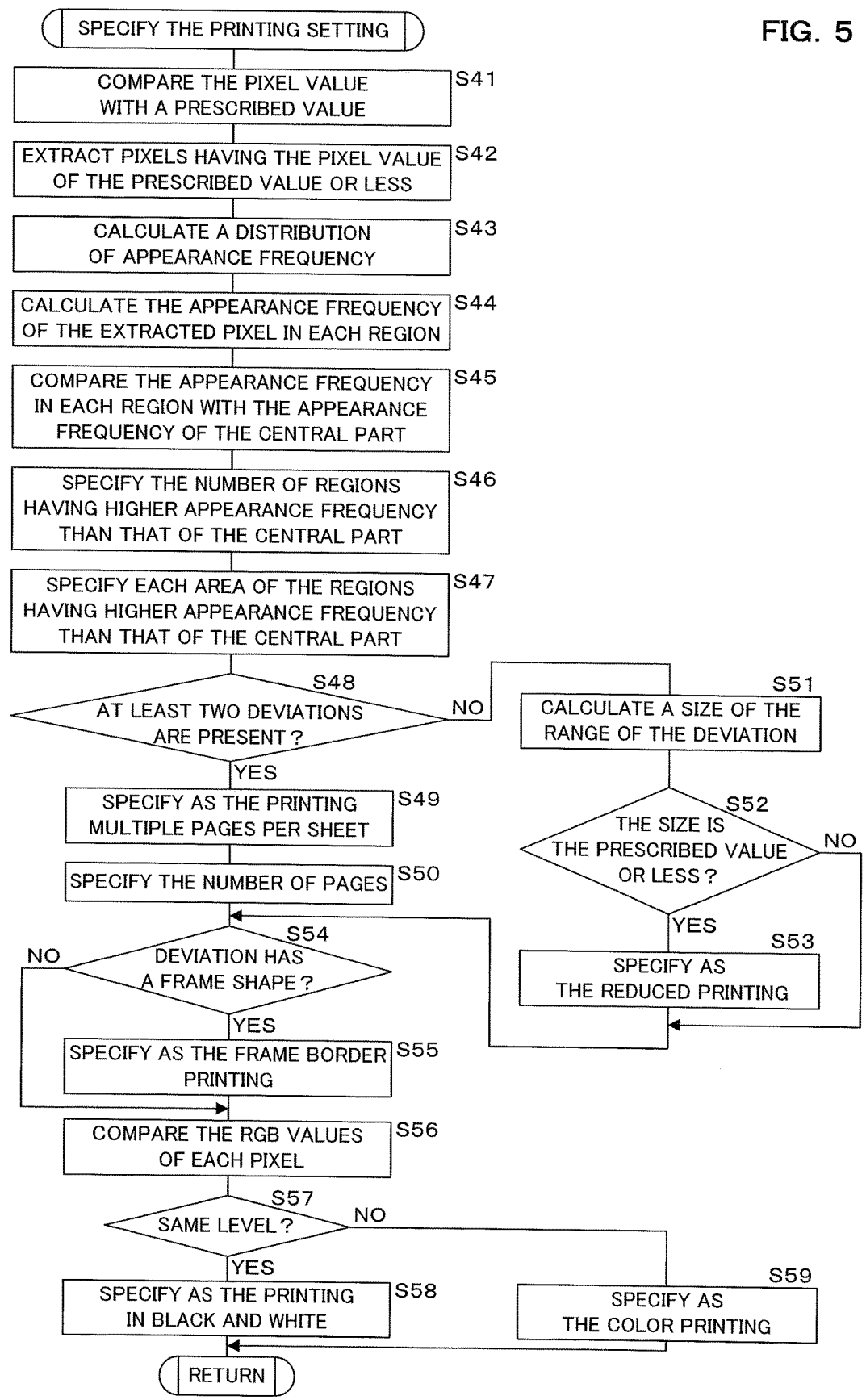
FIG. 5 is a flow chart illustrating an example of a detailed procedure of specific processing of a printing setting.

Next, the function of the printing setting specification unit 17 of the control unit 10 will be described in detail. FIG. 5 is a flow chart illustrating an example of a detailed procedure of the specific processing of the printing setting.

The control unit 10 scans all the pixels of the read image data by using the function of the printing setting specification unit 17 and compares the pixel value with a prescribed value (step S41). In this case, when the image data include pixel values for each RGB (R: red, G: green, B: blue) components, the control unit 10 may compare a value to which pixel values of all the color components for each pixel are added with the prescribed value and compare an average value of the pixel values of all the color components with the prescribed value. The control unit 10 may be configured to discriminate the image data for each block in advance and discriminate each block into a white region/gray region/black region, and then extract the blocks of the gray region and the black region.

The control unit 10 extracts pixels, which have the pixel values of the prescribed value or less, that is, a dark color and have characters or graphics printed therein, by the comparison in step S41 (step S42). In this case, the control unit 10 may be configured to extract the plurality of pixels for each block as described above.

The control unit 10 calculates a distribution of appearance frequency of the extracted pixels in a vertical direction and a horizontal direction of the image (step S43). That is, the control unit 10 applies the vertical direction and the horizontal direction of the printed paper to an XY coordinate in a pixel unit and projects a position of the extracted pixel to each of the X-axis direction and the Y-axis direction to obtain a histogram of the number of pixels as the distribution of appearance frequency.

The control unit 10 calculates the appearance frequency of the extracted pixel in each region which is divided into central, right, left, upper, lower, upper right, lower right, upper left, and lower left parts, etc., based on the distribution of appearance frequency of each of the vertical direction and the horizontal direction of the image (step S44). In this case, the range of the regions of the central, right, left, upper, lower, upper right, lower right, upper left, and lower left parts, etc., are defined prospectively based on the above-described XY coordinate, and the coordinate information of each region is stored in the storage unit 11. Each region may be overlapped with each other. In detail, the control unit 10 may calculate the appearance frequency of the extracted pixel in each region as the mean value of the number of extracted pixels in each region and may calculate the appearance frequency as a median value, a mode value, and the like.

The control unit 10 compares the appearance frequency in each of the right and left parts or the upper and lower parts with the appearance frequency of the central part, in each of the vertical direction and the horizontal direction (step S45). The control unit 10 specifies the number of regions in which the appearance frequency is higher than that of the central part (step S46), and specifies each area of the region in which the appearance frequency is higher than that of the central part (step S47). In this case, the control unit 10 determines whether the appearance frequency is high depending on whether, for the appearance frequency of the central part, the appearance frequency is high exceeding a prescribed range (for example, several %), the appearance frequency is several times or more of the appearance frequency in the central part, and the like. Otherwise, the control unit 10 determines that the appearance frequency is the same level or the appearance frequency in the central part is high.

The control unit 10 determines whether at least two deviations of the appearance frequency are present anywhere at least in the vertical and horizontal directions by comparing with the central part, based on the number of regions and the area of the region, which are specified in steps S46 and S47 (step S48). When it is determined that at least two deviations are present (YES in S48), the control unit 10 specifies the printing setting as the printing multiple pages per sheet (2-up printing) (step S49) and specifies the number of pages (step S50). For example, when it is determined that two deviations are present in the horizontal direction and one deviation is present in the vertical direction, the control unit 10 may set the number of pages to be two, and for example, when it is determined that two deviations are present in the horizontal direction and two deviations are present in the vertical direction, the control unit 10 may set the number of pages to be 4.

When it is determined that at least two deviations are not present in step S48 (NO in step S48), the control unit 10 calculates a size of the range of the deviation (step S51). The control unit 10 determines whether the size calculated in step S51 is a prescribed value or less (step S52). In this case, the prescribed value may be stored in the storage unit 11. When it is determined that the size is the prescribed value or less (YES in S52), the control unit 10 specifies the printing setting is a reduced printing (step S53) and progresses the processing to a next step S54. When it is determined that the size exceeds the prescribed value (NO in step S52), the control unit 10 progresses the processing to a next step S54 as it is.

Next, the control unit 10 determines whether the deviation has a frame shape (step S54). When the frequency distribution at the specific coordinate is, for example, three times or more of that of another region or the appearance frequency is specified as 80% or more, the control unit 10 determines that the deviation has a frame shape. For example, when the appearance frequencies at Y-th to Y+5-th positions from the top of the original are 80% or more, the control unit 10 determines that a ruled line is drawn around the Y-th position. Similarly, when the appearance frequencies at X-th to X+5-th positions from the left of the original are 80% or more, the control unit 10 determines that the ruled line is also drawn around the X-th position and the frame border is printed. Further, when it can be determined that the frame border is printed, other methods may be used. When it is determined that the deviation has the frame shape (YES in S54), the control unit 10 specifies the printing setting as the frame border printing (step S55). When it is determined that the deviation does not have the frame shape in step S54 (NO in S54), the control unit 10 progresses the processing to a next step S56 as it is.

The control unit 10 additionally compares the RGB values of the pixel values of each pixel with each other (step S56), and determines whether the RGB values have the same level within a prescribed error range (step S57). When it is determined that the RGB values have the same level (YES in S57), the control unit 10 specifies the printing setting as printing in black and white (step S58), and when it is determined that the RGB values are different exceeding the prescribed error range (NO in S57), the control unit 10 specifies the printing setting as color printing (step S59). Next, the processing to specify the printing setting ends and the processing returns to the processing procedure illustrated in the flow chart of FIG. 3. In this case, the control unit 10 compares the RGB values for each block with each other.

A detailed example of the processing to output by dividing the document file by the document file output apparatus 1 will be described below.

Figure 6:
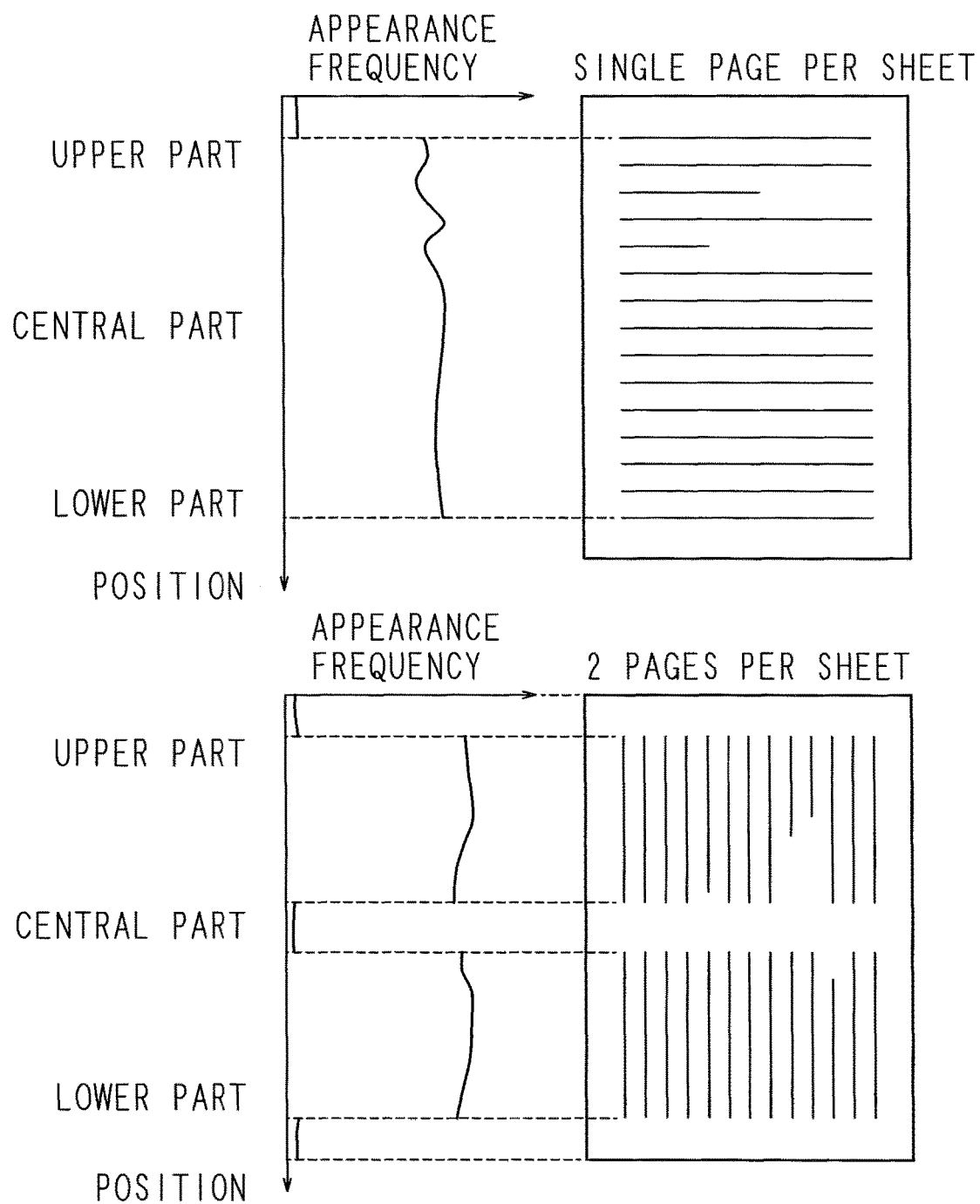
FIG. 6 is an image diagram of an example of a printed paper which is printed in printing multiple pages per sheet.

FIG. 6 is an image diagram of an example of a printed paper which is printed in printing multiple pages per sheet. An example of a printed paper including a sentence, the paper printed in printing single page per sheet is illustrated at the upper part of FIG. 6, and an example of a printed paper including a sentence, the paper printed in printing multiple pages per sheet is illustrated at the lower part of FIG. 6. Further, in the example of the lower part of FIG. 6, the number of pages is '2'. Further, FIG. 6 also illustrates graphs of the distributions in the vertical direction of the appearance frequency of the pixel (pixel on which characters or graphics are printed) in which the pixel value is the prescribed value or less, for each read printed paper. Each graph illustrates the positions in the vertical direction and the appearance frequencies at each position.

When the control unit 10 of the document file output apparatus 1 obtained the image data read from the printed paper as illustrated at the upper part of FIG. 6, the control unit 10 calculates the distribution of appearance frequency in the vertical direction as illustrated in the upper left part of FIG. 6 based on the pixel value. The control unit 10 compares the appearance frequencies of the pixels, such as characters or graphics in the upper and lower parts with the appearance frequency of the central part, respectively. In this case, the control unit 10 determines that the appearance frequencies in the upper and lower parts are the same level as that of the central part, respectively. When it is determined that the deviation between the appearance frequencies is one, the control unit 10 may specify that the printing multiple pages per sheet is not set.

Similarly, when the control unit 10 of the document file output apparatus 1 obtained the image data read from the printed paper as illustrated at the upper part of FIG. 6, the control unit 10 calculates the distribution of appearance frequency in the vertical direction as shown at the lower left part of FIG. 6 based on the pixel value. In this case, the control unit 10 compares the appearance frequencies in the upper and lower parts with the appearance frequency of the central part, respectively, to determine that the appearance frequencies in each of the upper and lower parts are higher than that of the central part, such that the control unit 10 may determine that the deviation of the appearance frequency is two. Further, the control unit 10 may specify that the printing multiple pages per sheet is set and specify that the number of pages is '2'.

Figure 7:
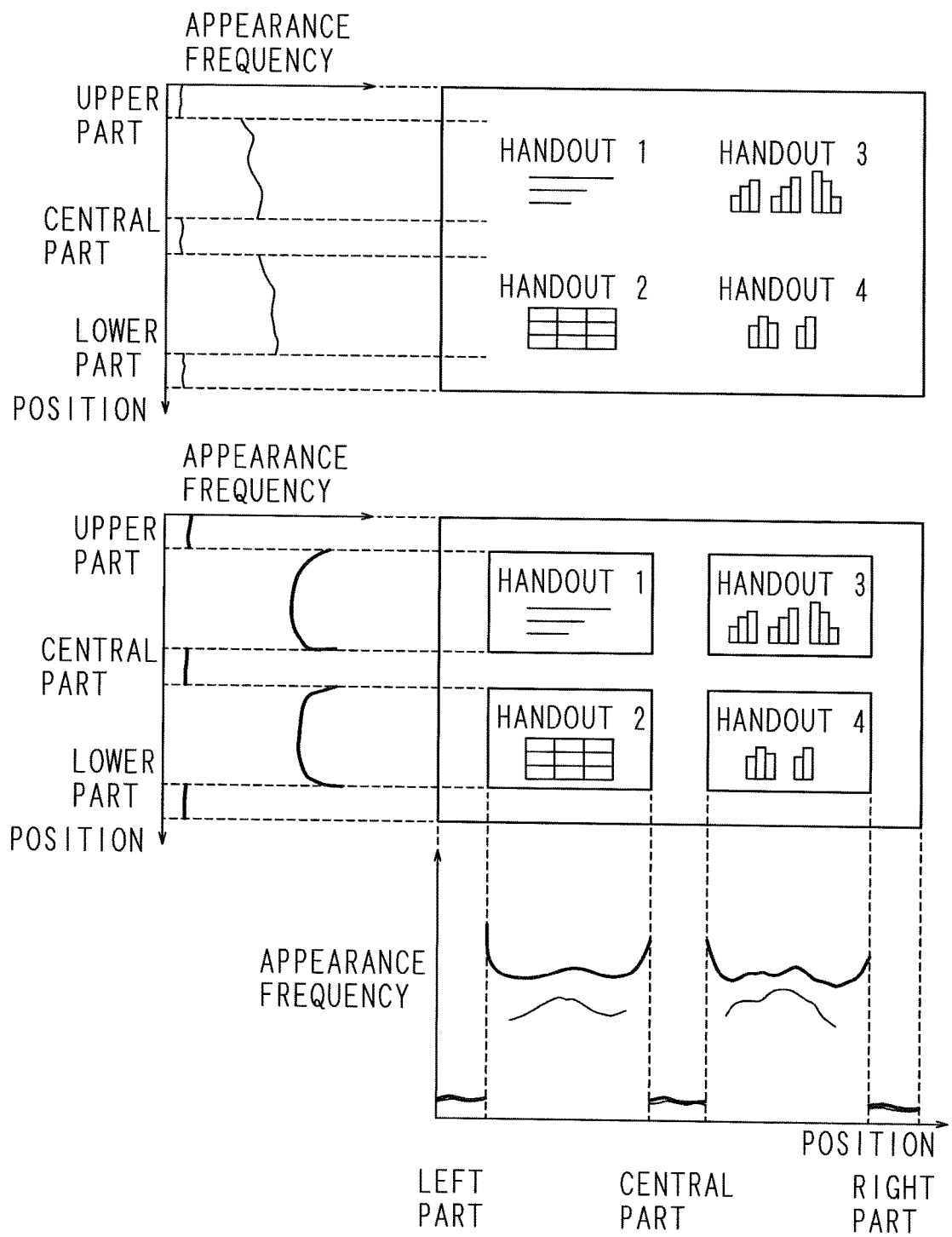
FIG. 7 is an image diagram of an example of a printed paper which is printed in printing multiple pages per sheet and frame border printing.

FIG. 7 is an image diagram of an example of a printed paper which is printed in printing multiple pages per sheet and frame border printing. An example of a printed paper including a sentence and a graphic, the paper printed in printing multiple pages per sheet but not in frame border printing is shown at an upper end of FIG. 7. An example of a printed paper including a sentence and a graphic, the paper printed in printing multiple pages per sheet and frame border printing is shown at a middle part of FIG. 7. Further, in the example illustrated in FIG. 7, the number of pages is '4'. Further, FIG. 7 also illustrates graphs of the distributions in the vertical and horizontal directions of the frequency of the pixel (pixel on which characters or graphics are printed) in which the pixel value is the prescribed value or less, for each original. Each graph illustrates the positions in the image and the appearance frequencies in each position.

When the control unit 10 of the document file output apparatus 1 obtains the image data read from the printed paper as illustrated at the upper part of FIG. 7, the control unit 10 calculates the distribution of appearance frequency in the vertical direction as illustrated in the upper left part of FIG. 7 based on the pixel value, and calculates the distribution of appearance frequency in the horizontal direction as shown by a thin line within the graph of the lower part of FIG. 7. The control unit 10 compares the appearance frequencies of the pixels, such as characters or graphics in the upper and lower parts and the appearance frequencies in the left and right parts with the appearance frequency of the central part, respectively. In this case, the control unit 10 determines that the appearance frequencies of the upper and lower parts are higher than that of the central part in the vertical direction, as compared with the appearance frequency in the central part. Similarly, the control unit 10 determines that the appearance frequencies in the left and right directions are higher than that of the central part in the horizontal direction. Therefore, the control unit 10 determines that the deviation of the appearance frequency is four (2×2). In addition, the control unit 10 specifies that the printing multiple pages per sheet is set and specifies that the number of pages is '4'. Further, in this case, the control unit 10 determines that the frequency distributions in the pixel of the specific coordinate, for example, the frequency distributions in the Y-th pixel to Y+5-th pixels from the top in the vertical direction, are the same level as the frequency in the region which has a frequency higher than that of another central part, based on the distribution of appearance frequency in the vertical and horizontal directions, and specifies that the frame border printing is not set.

When the control unit 10 of the document file output apparatus 1 obtains the image data from reading the printed paper shown at the middle part of FIG. 7, the control unit 10 calculates the distribution of appearance frequency in the vertical direction as illustrated in the left middle of FIG. 7 based on the pixel value, and calculates the distribution of appearance frequency in the horizontal direction as shown by a thick line within the graph of the lower part of FIG. 7. Even in this case, the control unit 10 determines that all the appearance frequencies of each of the upper, lower, left, and right parts are higher than that of the central part and the deviation of the appearance frequencies is 4, as compared with the appearance frequency in the central part. Further, the control unit 10 specifies that the printing multiple pages per sheet is set and specifies that the number of pages is '4'. In this case, the control unit 10 determines that the frequency distributions in the pixels of the specific coordinate, for example, in Y to Y+5-th pixels from the top in the vertical direction and in Y to Y+5-th pixels from the bottom in the vertical direction are several times or more of the frequency in the region which has a higher frequency than another central part or are 80% or more, based on the distribution of appearance frequency in the vertical direction. Similarly, the control unit 10 determines that the frequency distributions in the pixels of the specific coordinate, for example, in X to X+5-th pixels from the left and in X to X+5-th pixels from the right are several times or more of the frequency in the region which has a higher frequency than another central part, based on the distribution of appearance frequency in the horizontal direction. Thereby, the control unit 10 may specify that the frame border printing is set.

Figure 8:
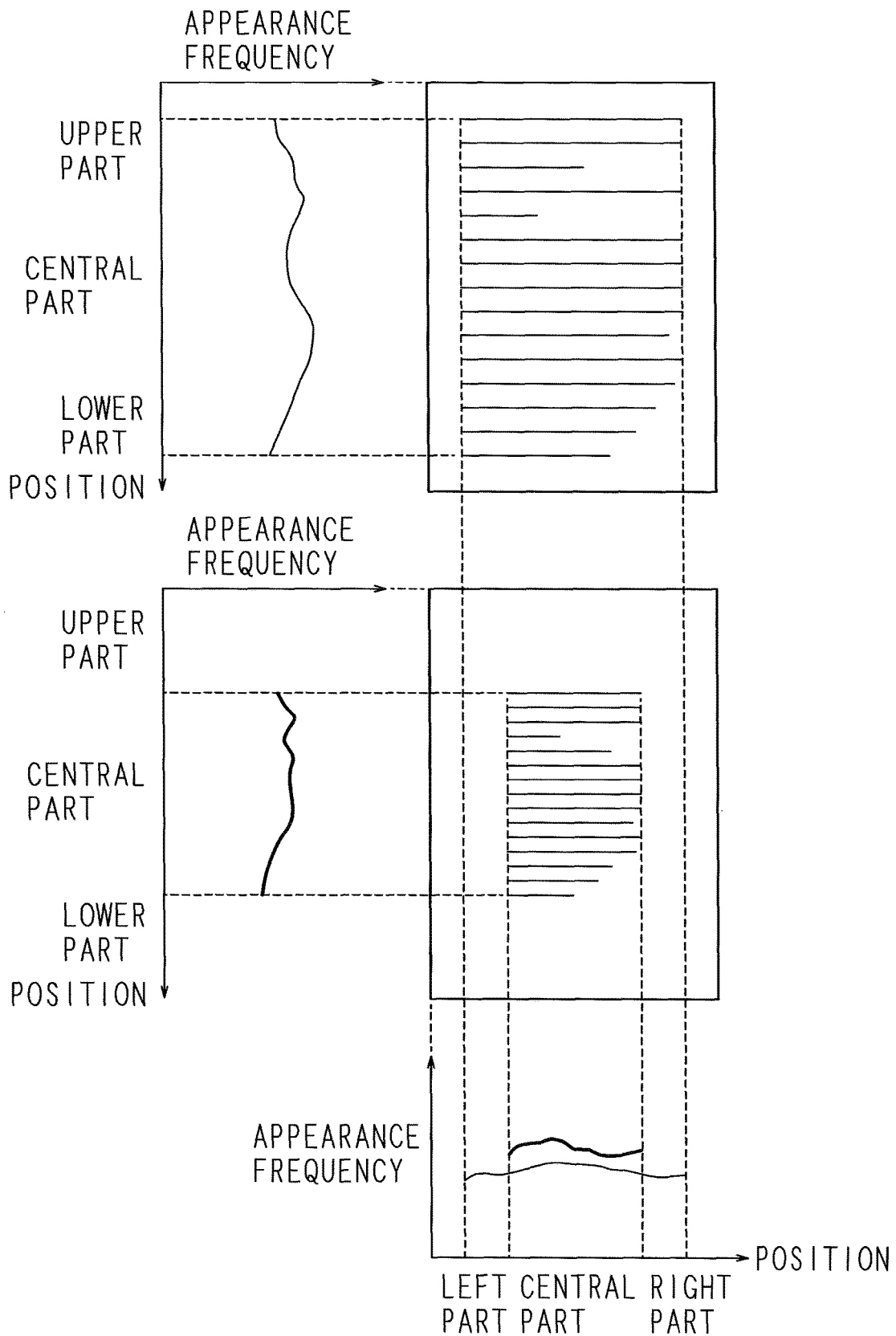
FIG. 8 is an image diagram of an example of a printed paper which is printed in reduced printing.

FIG. 8 is an image diagram of an example of a printed paper which is printed in reduced printing. An example of a printed paper including a sentence in which normal printing is performed is illustrated at the upper part of FIG. 8 and an example of a printed paper including a sentence in which the reduced printing is set is illustrated at the lower part of FIG. 8. Further, FIG. 8 also illustrates graphs of distributions in the vertical and horizontal directions of the frequency of the pixel (pixel on which characters or graphics are printed) in which the pixel value is the prescribed value or less, for each printed paper. Each graph illustrates the positions in the image and the appearance frequencies in each position.

When the control unit 10 of the document file output apparatus 1 obtains the image data read from the printed paper as illustrated at the upper part of FIG. 8, the control unit 10 calculates the distribution of appearance frequency in the vertical direction as illustrated in the upper left part of FIG. 8 based on the pixel value, and calculates the distribution of appearance frequency in the horizontal direction as shown by a thin line within the graph of the lower part of FIG. 8. The control unit 10 compares the appearance frequency of the pixels, such as characters or graphics in the central part with the appearance frequency in the upper and lower parts, respectively. In this case, the control unit 10 determines that the appearance frequencies in the upper and lower part are the same level as that of the central part, respectively, and the deviation of the appearance frequency is one. Further, the control unit 10 calculates the size of the range of the deviation. In detail, the control unit 10 specifies the range of the continuous distributions in the vertical and horizontal directions as shown by a broken line, and calculates the sizes based on the specified ranges in the vertical and horizontal directions. In this case, if it is determined that the calculated size is not the preset prescribed value or less, the control unit 10 specifies that the special printing is not set.

When the control unit 10 of the document file output apparatus 1 obtains the image data read from the printed paper as illustrated at the lower part of FIG. 8, the control unit 10 calculates the distribution of appearance frequency in the vertical direction as illustrated in the lower left part of FIG. 8 based on the pixel value, and calculates the distribution of appearance frequency in the horizontal direction as shown by a thick line within the graph of the lower part of FIG. 8. In this case, the control unit 10 determines that the appearance frequencies in the upper and lower parts are lower than that of the central part, respectively and the deviation of the appearance frequency is one. Further, the control unit 10 calculates the size of the range of the deviation. In this case, when it is determined that the calculated size is the preset prescribed value or less, the control unit 10 specifies that the reduced printing is set.

As described above, the document file output apparatus 1 according to Embodiment 1 specifies the printing setting for each of the read printed paper of the image data based on the image data of the plurality of printed papers obtained from the reading apparatus 3 and outputs by appropriately dividing the document file depending on the change in the printing setting. Further, the printing setting is not limited to an example described above and illustrated in the drawings, and therefore a method for specifying various printing settings such as thicker/thinner or a saving printing, and the like from an average concentration or in the case of the color printing, the bright color printing setting based on the chroma, and the like and discriminately and appropriately dividing the document may be considered.

According to Embodiment 1, the document file output apparatus 1 is configured to output by dividing the image data as the document file based on only the difference in the printing setting. However, the document file output apparatus 1 may be configured to calculate a feature amount of each image data read from printed paper, and determine whether the image data of each printed paper are divided as different document files based on the differences in the printing setting and calculated features.

Embodiment 2

According to Embodiment 2, examples will be described below, in which the paper size, the embedded image, the specific printing format, and the character string in the specific region within the printed paper are specified in addition to the printing setting specified by the function of the printing setting specification unit 17 of the document file output apparatus 1 according to Embodiment 1, and when they are changed, the document file is divided.

Figure 9:
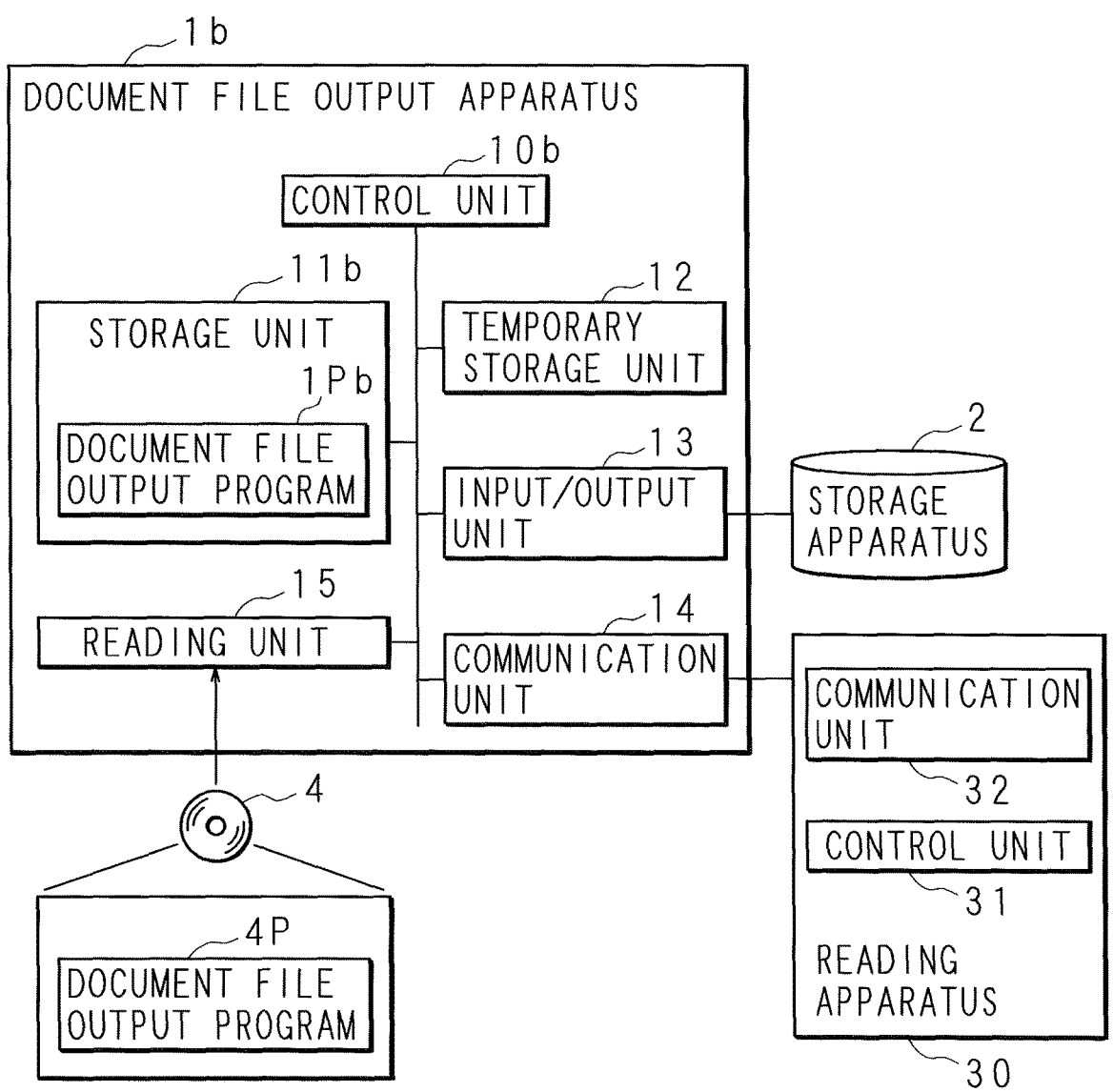
FIG. 9 is a block diagram illustrating a configuration of a document file output system according to Embodiment 2.

FIG. 9 is a block diagram illustrating a configuration of a document file output system according to Embodiment 2. A document file output system according to Embodiment 2 includes a document file output apparatus 1b, a storage apparatus 2, and a reading apparatus 30. A configuration of the document file output system according to Embodiment 2 is the same as the configuration according to Embodiment 1 other than the method for specifying the printing setting by the document file output apparatus 1b and the function of the reading apparatus 30. Therefore, the components having functions common to Embodiment 1 are denoted by the same reference numerals and a detailed description thereof will be omitted.

Figure 10:
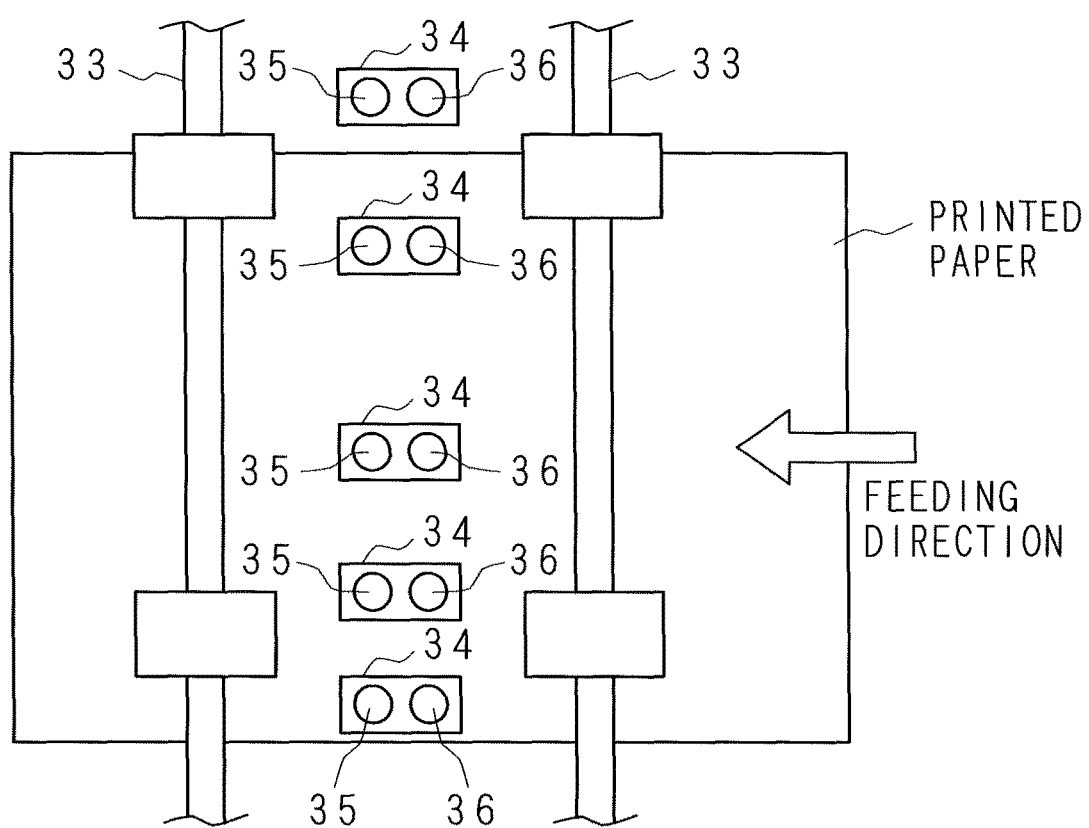
FIG. 10 is a diagram schematically illustrating a configuration of an original size discriminating mechanism of an automatic document feeder of a reading apparatus according to Embodiment 2 as seen the bottom.

The configuration of the reading apparatus 30 is substantially the same as the configuration of the reading apparatus 3 according to Embodiment 1, but is different from Embodiment 1 in that the automatic document feeder has an original size discriminating mechanism. FIG. 10 is a diagram schematically illustrating the configuration of the original size discriminating mechanism of the automatic document feeder of the reading apparatus 30 according to Embodiment 2 as seen below. The automatic document feeder of the reading apparatus 30 includes a control unit 31, a communication unit 32, two conveyor rollers 33, and a plurality of optical sensors 34 which are arranged in a direction substantially orthogonal to a rotating direction of the conveyor rollers 33.

The control unit 31 controls each component using a micro processing unit (MPU). The control unit 31 detects a rotating speed of the conveyor rollers 33 to be able to specify the feeding speed of the original. Further, the control unit 31 obtains results detected by the plurality of optical sensors 34, respectively. The control unit 31 specifies the fed printed paper size based on the feeding speed of the printed paper and the results detected by each of the optical sensors 34. The control unit 31 stores the specified size in the embedded storage unit along with the image data read from the fed printed paper or sequentially transmits them to the document file output apparatus 1b through the communication unit 32.

The communication unit 32 is an interface which corresponds to the communication unit 14 of the document file output apparatus 1b. The communication unit 32 transmits and receives information through the LAN based on a prescribed communication protocol. Further, the communication unit 32 may be replaced by the interface such as the USB, and the control unit 31 may output the image data and the specified paper size to the document file output apparatus 1.

The plurality of optical sensors 34 each includes a light emitting device 35 and a light receiving device 36. The optical sensor 34 emits light from the light emitting device 35 when the paper is present on the automatic document feeder, for example, every 30 milliseconds, which allows the light receiving device 36 to receive the reflected light from the original and outputs a signal to the control unit 31 in response to the received amount of light.

The control unit 31 specifies whether the feeding paper is present on any optical sensor 34 and specifies a width of the paper, based on the signal obtained by the optical sensor 34. Further, the control unit 31 calculates a passing time of a sheet of the paper based on a signal every prescribed time from the optical sensor 34 and specifies a length of the paper based on the feeding speed. The control unit 31 specifies the paper size as, for example, A4, A4-vertical size, B5, and the like based on the width and length of the paper. The control unit 31 stores the specified results along with the image data read from each printed paper or transmits them through the communication unit 32.

Similar to Embodiment 1, a personal computer is used for the document file output apparatus 1b according to Embodiment 2. The document file output apparatus 1b includes a control unit 10b, a storage unit 11b, a temporary storage unit 12, an input/output unit 13, a communication unit 14, and a reading unit 15. The control unit 10b implements each function to be described below based on the document file output program 1Pb which is stored in the storage unit 11*b*. The storage unit 11*b* stores the image data of the embedded image (fingerprint) used for the pattern matching to be described below and image data of a specific printing format, in addition to the document file output program 1P.

Figure 11:
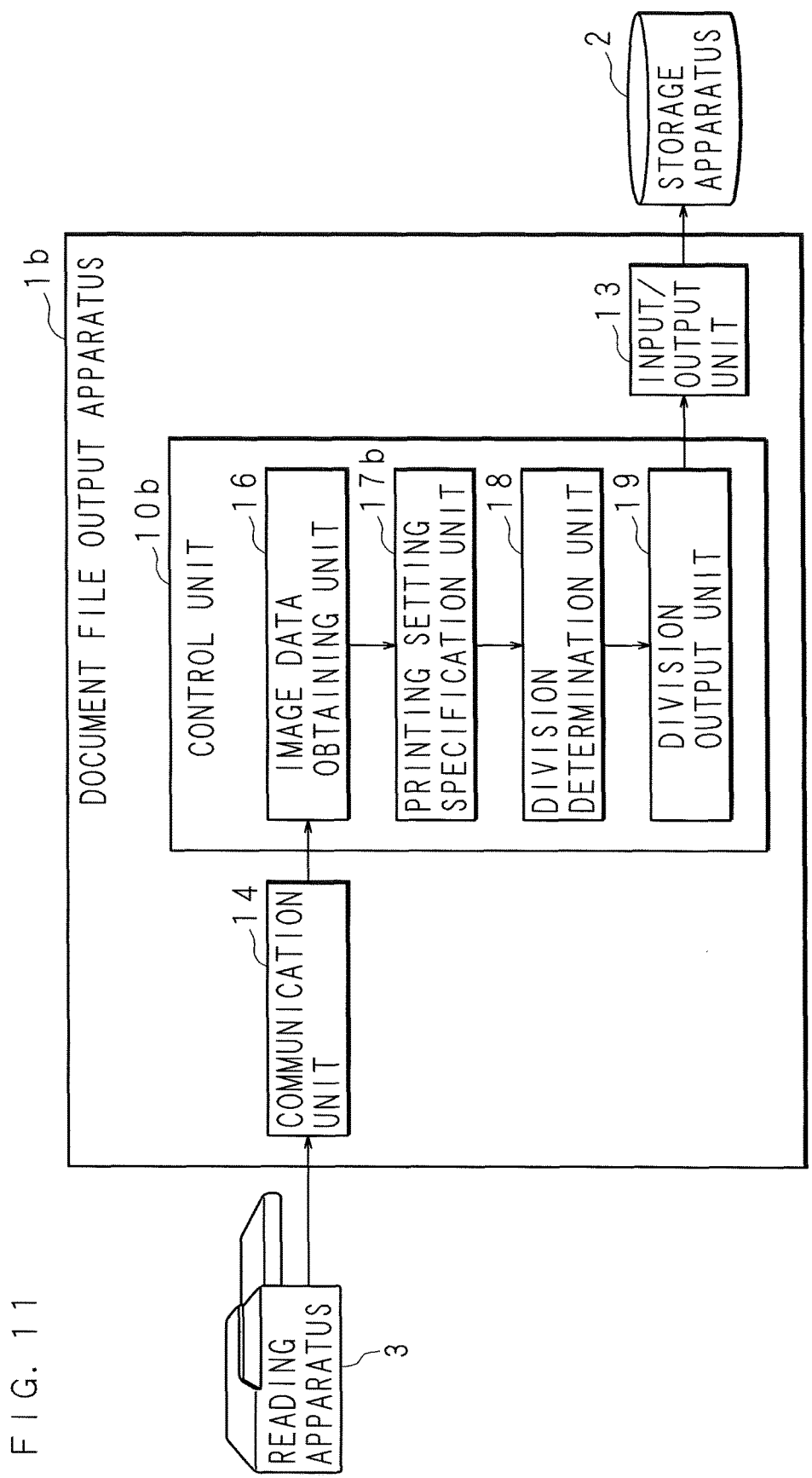
FIG. 11 is a functional block diagram illustrating a function which is implemented a document file output apparatus according to Embodiment 2.

FIG. 11 is a functional block diagram illustrating the function which is implemented in the document file output apparatus 1*b* according to Embodiment 2. The control unit 10*b* of the document file output apparatus 1*b* serves as an image data obtaining unit 16, a printing setting specification unit 17*b*, a division determination unit 18, and a division output unit 19. Further, each component may be implemented in hardware as a specific integrated circuit. Therefore, the components having common function with each component in Embodiment 1 are denoted by the same reference numerals and a detailed description thereof will be omitted.

The control unit 10*b* of the document file output apparatus 1*b* according to Embodiment 2 serves as the printing setting specification unit 17*b* and specifies the printing setting which includes the image size obtained from the reading apparatus 30, presence or absence of the embedded image (fingerprint) by the pattern matching and the contents thereof, a printing format such as a particular slip format, and the presence or absence of a character string printed in a specific region such as a header portion of a read printed paper and the contents thereof, in addition to the printing setting described in Embodiment 1.

Figure 12:
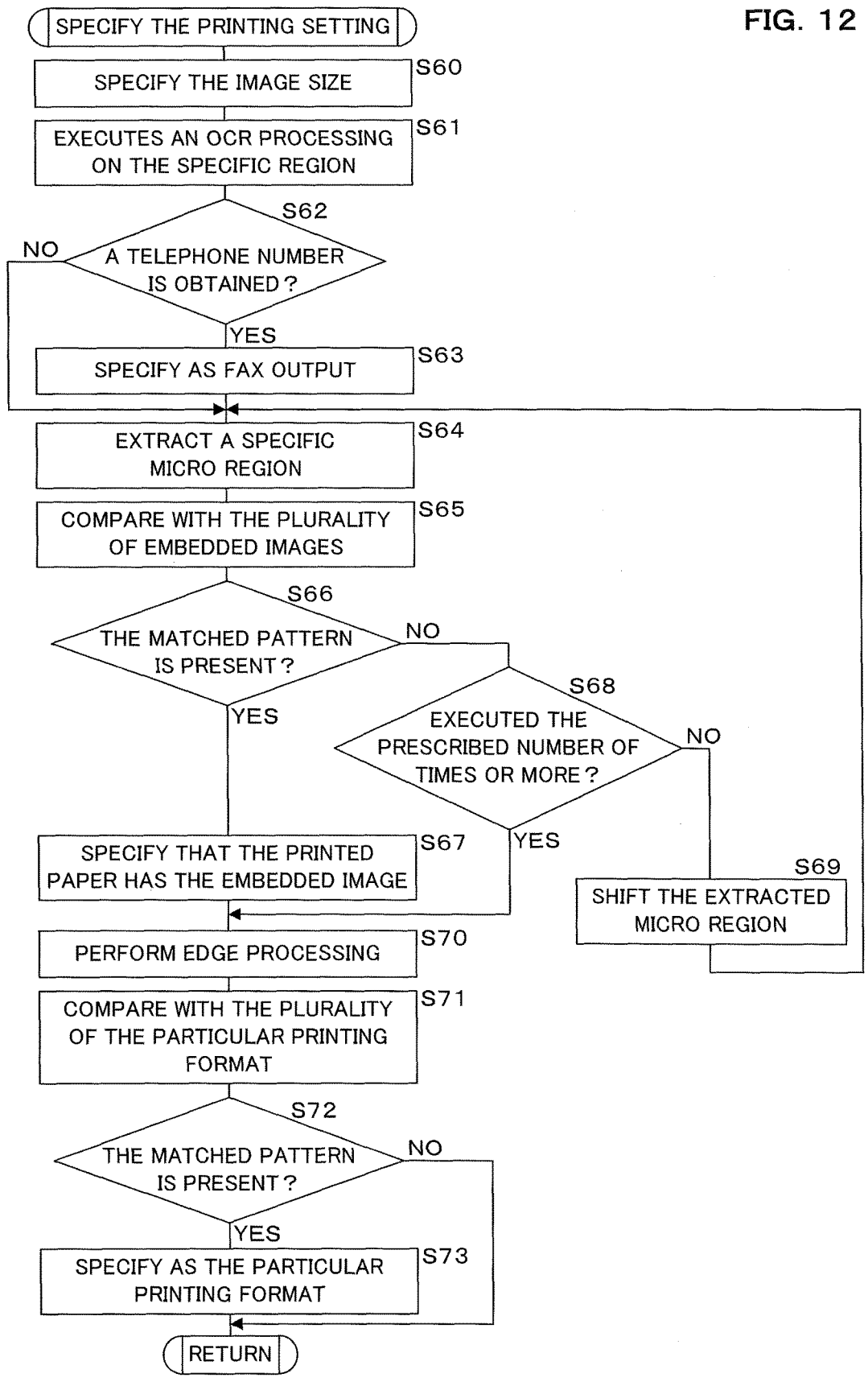
FIG. 12 is a flow chart illustrating an example of a detailed procedure of specific processing of a printing setting which is additionally executed.

Similar to Embodiment 1, the control unit 10*b* executes a processing procedure illustrated in the flow chart of FIG. 3. As the specific processing of the printing setting of steps S104 and S107 in the processing procedure, the following processing is executed, in addition to the flow chart illustrated in FIG. 5. FIG. 12 is a flow chart illustrating an example of a detailed procedure of specific processing of a printing setting which is additionally executed.

The control unit 10*b* specifies the image size obtained in response to the read image data by the function of the printing setting specification unit 17*b* (step S60).

Next, the control unit 10*b* executes an optical character reader (OCR) processing on the specific region within the read image data by using the function of the printing setting specification unit 17*b* (step S61). For this, the document file output apparatus 1*b* may include the hardware to execute the OCR processing. In detail, the control unit 10*b* performs the OCR processing on the header portion in a direction in which the printed paper is read and obtains the read character string. The control unit 10*b* determines whether a telephone number may be obtained by the OCR processing (step S62). When it is determined that the telephone number is obtained (YES in S62), the control unit 10*b* specifies the printed paper as FAX output and specifies the obtained number as a telephone number of a transmission source (step S63). When it is determined that the telephone number is not obtained in step S62 (NO in step S62), the control unit 10*b* progresses the processing to a next step.

The control unit 10*b* extracts a specific micro region within the read image data by the function of the printing setting specification unit 17*b* (step S64). The control unit 10*b* compares the image of the extracted region with the plurality of embedded images stored in the storage unit 11*b* (step S65) to determine whether the matched pattern is present (step S66). If it is determined that the matched pattern is present in step S66 (YES in S66), the control unit 10*b* specifies that the printed paper has the embedded image in association with the information identifying the matched patterns of images (step S67) and progresses the processing to step S70.

When it is determined that the matched pattern is not present in step S66 (NO in step S66), the control unit 10*b* determines whether the processing procedure is executed the prescribed number of times or more (step S68). When it is determined that the processing procedure is less than the prescribed number of times (NO in S68), the control unit 10*b* shifts the extracted micro region corresponding to a prescribed number of pixels (step S69), returns the processing to step S64, and repeats the processing of steps S65 to S69. When it is determined that the processing procedure is executed the prescribed number of times in step S68 (YES in S68), the control unit 10*b* progresses the processing to a next step S70. In this case, it is specified that the printed paper does not have the embedded image (fingerprint).

The control unit 10*b* performs edge processing on the read image data (step S70), and compares the image of the image data after the edge processing with the plurality of patterns corresponding to the particular printing format stored in the storage unit 11*b* (step S71) to determine whether the matched pattern is present (step S72). When it is determined that the matched pattern is present in step S72 (YES in S72), the control unit 10*b* specifies the printing setting as the particular printing format in association with the information identifying the matched patterns of images (step S73), and ends the processing specifying the printing setting. Next, the processing returns to the processing procedure illustrated in the flow chart of FIG. 3. Meanwhile, when it is determined that the matched pattern is not present in step S72 (NO in S72), the control unit 10*b* ends the processing, specifying the printing setting as it is, and returns the processing to the processing procedure illustrated in the flow chart of FIG. 3.

A detailed example of the processing to output by dividing the document file by the document file output apparatus 1*b* will be described below.

First, when the next specified printed paper size is different from the printed paper size before that, the control unit 10*b* determines that the printing setting is changed by using the function of the division determination unit 18, and the image data up to the read printed paper, in which the printed paper size is changed, are completed as one document file.

Figure 13:
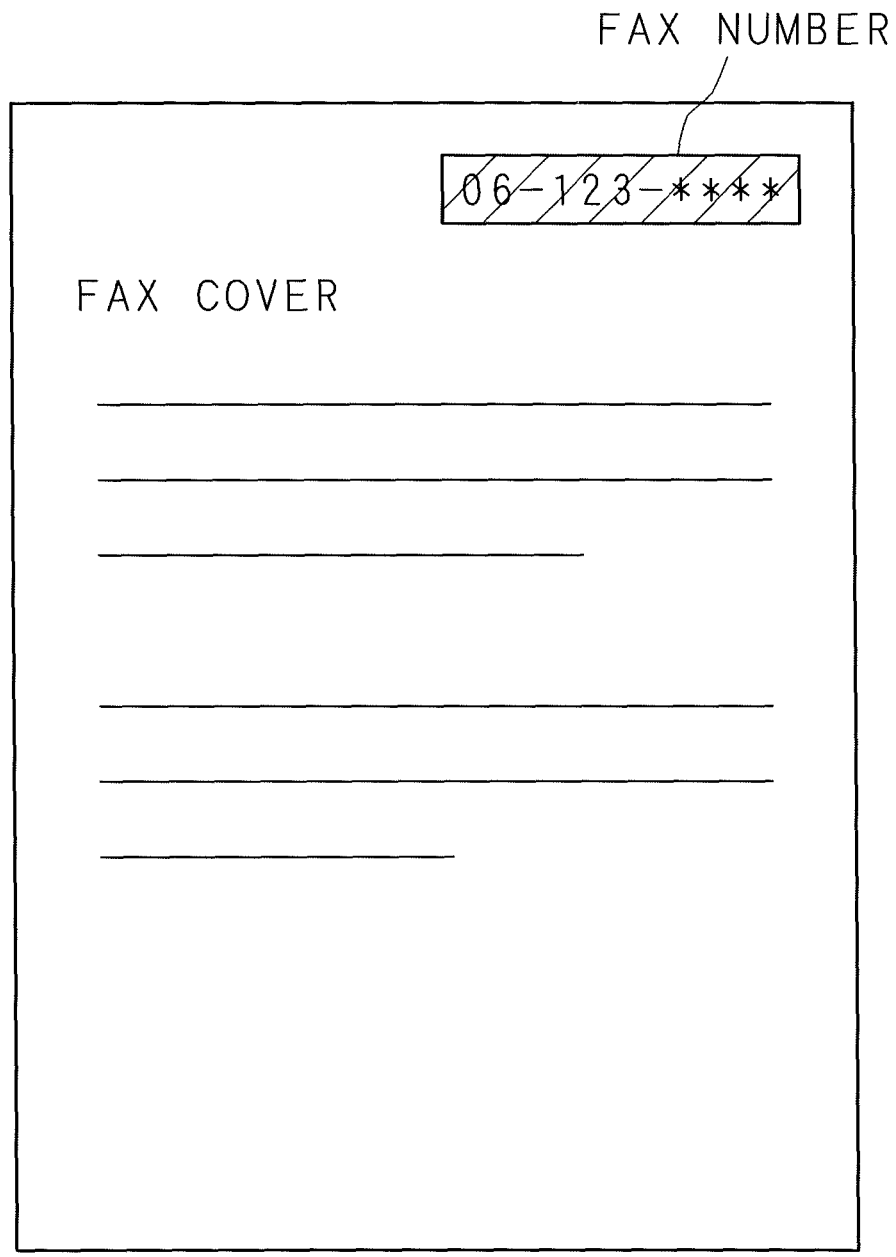
FIG. 13 is an image diagram of an example of a printed paper which is a FAX output.

FIG. 13 is an image diagram of an example of a printed paper which is a FAX output. As illustrated in FIG. 13, the telephone number (FAX number) of the transmission source is printed in the header portion (shown by hatching in the drawings) of the printed paper which is output by the FAX. When the control unit 10*b* of the document file output apparatus 1*b* obtains the image data read from the original as illustrated in FIG. 13, the control unit 10*b* obtains the telephone number by the OCR processing. In this case, the control unit 10*b* specifies that the read printed paper is the FAX output and specifies the obtained telephone number as the information for identifying with other printed papers.

When the control unit 10*b* obtains the image data read from the original as illustrated in FIG. 13 and the printing setting of the subsequent specified printed paper is not the FAX output, the control unit 10*b* determines that the printing setting is changed, by using the function of the division determination unit 18. Alternately, when the obtainable telephone number (FAX number) is different although the printed paper is the FAX output, the control unit 10*b* determines that the printing setting is changed. Further, the control unit 10*b* brings one document file to completion up to the printed paper illustrated in FIG. 13.

Figure 14:
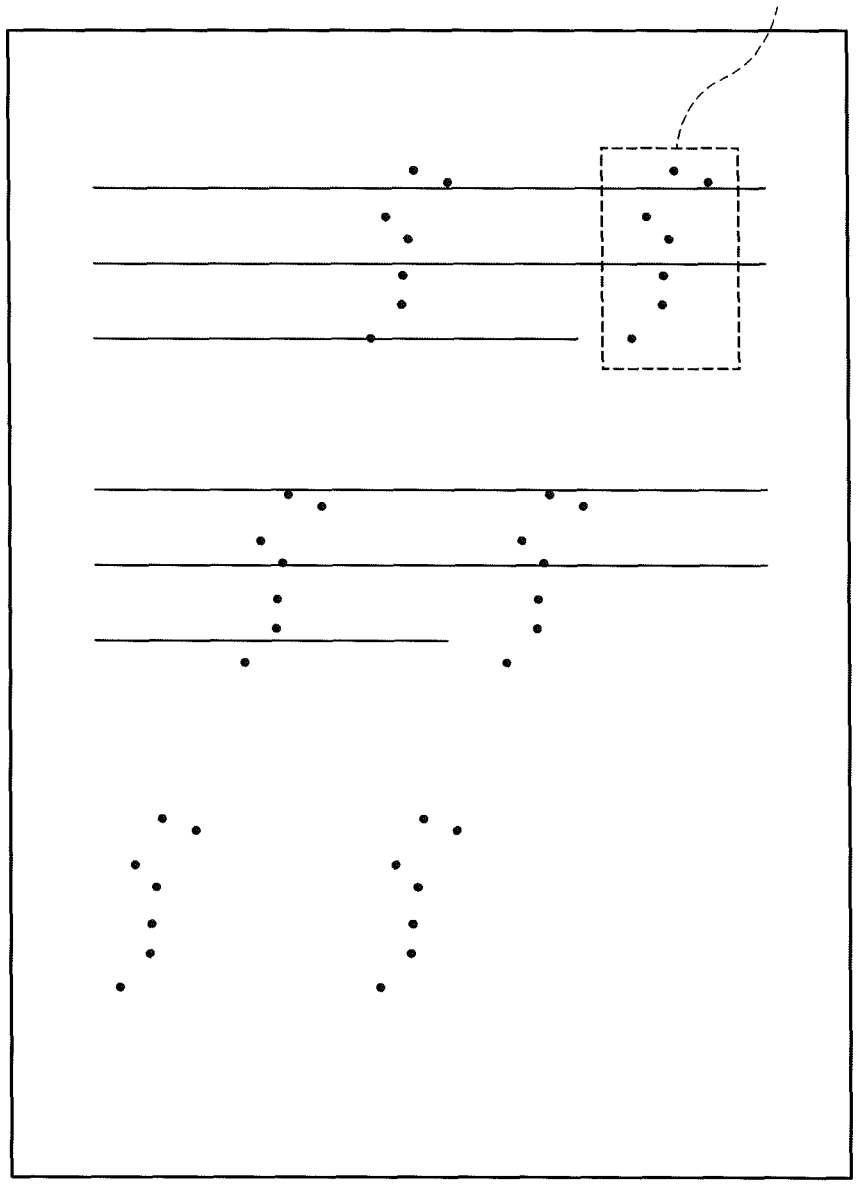
FIG. 14 is an image diagram of an example of a printed paper having embedded image.

FIG. 14 is an image diagram of an example of a printed paper having embedded image. As illustrated in FIG. 14, the image forming apparatus capable of embedding the image, overlaps the particular images so as to be dispersed at a plurality of places of the printed paper by the printing setting. The position of the embedded image may be set so as to be at any position and set so as to be embedded in the particular place.

When the control unit 10b of the document file output apparatus 1b obtained the image data read from the original as illustrated in FIG. 14, the control unit 10b extracts a region of a particular size (for example 32×32 pixels), based on the particular position (for example, a lower left end of an image) of the image data, and performs pattern matching processing with the plurality of embedded image patterns stored in the storage unit 11b. When the control unit 10b determined that the pattern of the image data does not match with the patterns stored in the storage unit, the control unit 10b performs the processing of the pattern matching, by shifting the region as much as a prescribed interval, for example, by shifting the region as much as five pixels to the right in a horizontal direction. When a pattern matched with one of the patterns of the image stored in the storage unit 11b is determined to be present by the pattern matching, the control unit 10b specifies the printing setting as a printing with embedding image. In this case, the identification information (for example, serial number or pattern name) of the matched patterns of images is specified as the information for identifying with other printed papers. When it is determined that the matched pattern is not present by the pattern matching, the control unit 10b determines that the image is not embedded.

When the control unit 10b obtains the image data read from the original as illustrated in FIG. 14, the control unit 10b determines that the printing setting is changed by using the function of the division determination unit 18 if the image embedding is not present in the specified printing setting of the subsequent printed paper. Alternately, although the image embedding is present, when the matched patterns of images are different, the control unit 10b determines that the printing setting is changed. Further, the control unit 10b brings one document file to completion up to the printed paper illustrated in FIG. 14.

Figure 15:
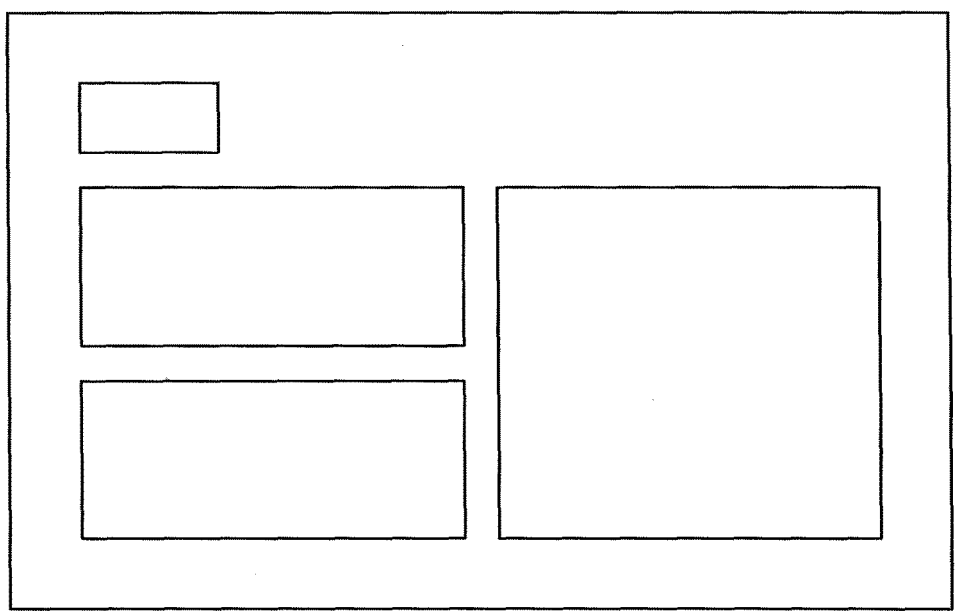
FIG. 15 is an image diagram of an example of a printed paper by a particular printing format.

FIG. 15 is an image diagram of an example of a printed paper by a particular printing format. There is also an image forming apparatus which may perform the printing by the particular layout, such as a particular slip format. In this case, as illustrated in FIG. 15, the frame border is printed by the particular layout.

When the control unit 10b of the document file output apparatus 1b obtains the image data read from the original as illustrated in FIG. 15, the control unit 10b extracts pixels which are subjected to edge processing or is black to specify the frame border. The control unit 10b performs the matching processing, with the plurality of frame border patterns corresponding to the particular printing format which is stored in the storage unit 11b, on the specified frame border. When a pattern matched with the stored patterns is present, the control unit 10b specifies the printing setting of the particular format. Meanwhile, the control unit 10b specifies the identification information (for example, serial number or format name) of the matched pattern of the format as information for identifying with other printed papers. When it is determined that the matched pattern is not present by the pattern matching, the control unit 10b determines that the printing setting is not the particular printing format.

When the control unit 10b obtains the image data read from the printed paper as illustrated in FIG. 15, the control unit 10b determines that the printing setting is changed, by using the function of the division determination unit 18, when it is determined that the specified printing setting of the subsequent printed paper is not the particular printing format. Alternately, although it is determined that the printing setting is the particular printing format, when the matched patterns of formats are different, the control unit 10b determines that the printing setting is changed. Further, control unit 10b brings one document file to completion up to the printed paper illustrated in FIG. 15.

As described above, the document file output apparatus 1b according to Embodiment 2 specifies the printing setting for each of the read printed paper of the image data, based on the image data of the plurality of printed papers obtained from the reading apparatus 30, and may output by appropriately dividing the document file depending on the change in the printing setting such as the change in the paper size.

Embodiment 3

According to Embodiment 3, a document file output apparatus 1c has a configuration to notify the user of the setting change when it is determined that the printing setting is changed.

Figure 16:
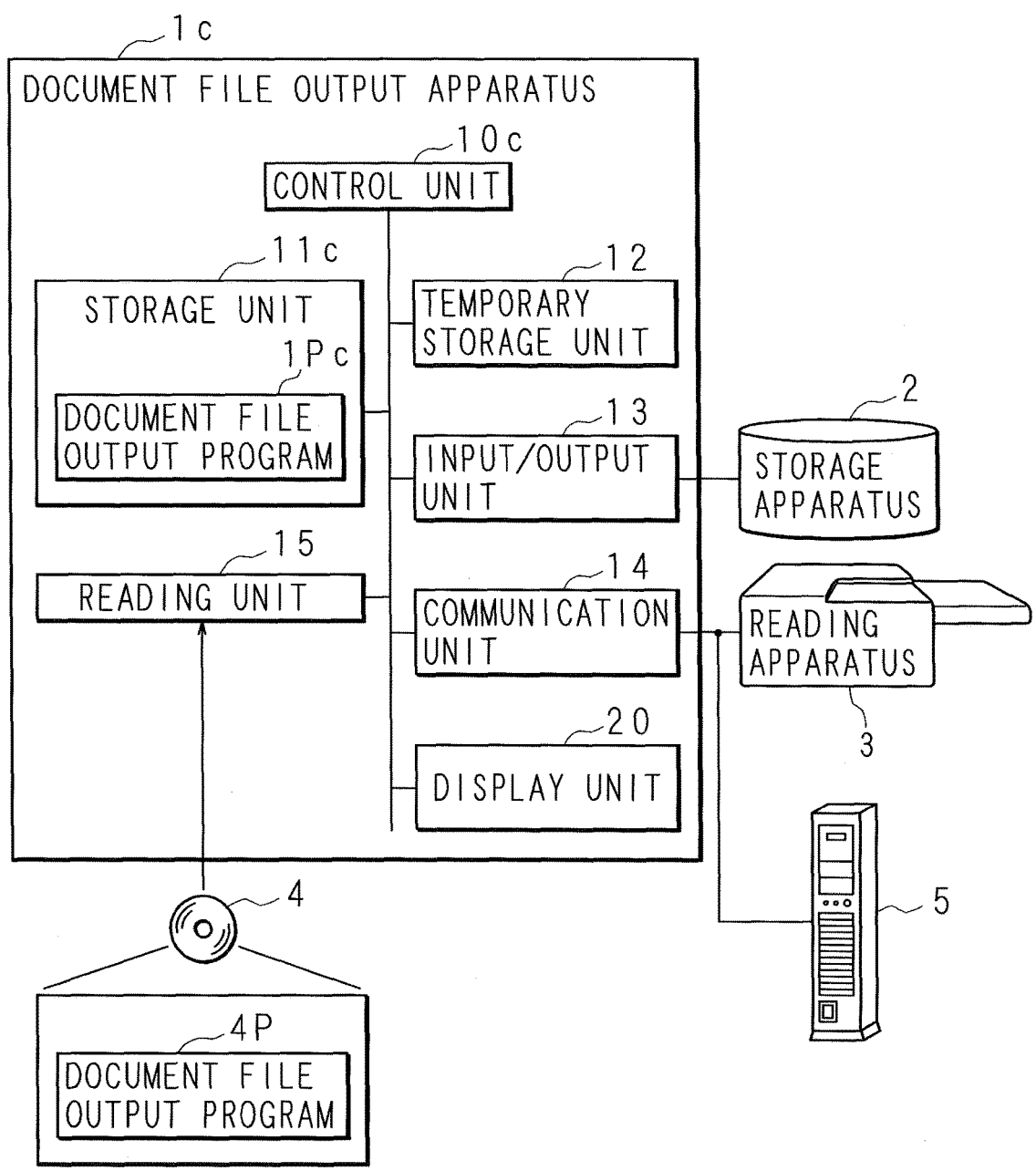
FIG. 16 is a block diagram illustrating a configuration of a document file output system according to Embodiment 3.

FIG. 16 is a block diagram illustrating a configuration of a document file output system according to Embodiment 3. The document file output system according to Embodiment 3 includes a document file output apparatus 1c, a storage apparatus 2, a reading apparatus 3, and a server apparatus 5. The configuration of the document file output system according to Embodiment 3 is the same as the configuration according to Embodiment 1 other than the adding of the notification processing by the document file output apparatus 1c. Therefore, the components having function common to Embodiment 1 are denoted by the same reference numerals and a detailed description thereof will be omitted.

The server apparatus 5 includes a mail server function and a Web server function. When receiving the notification to be described below from the document file output apparatus 1c, the server apparatus 5 may transmit and receive the mail or write a Web page depending on the received notification. When obtaining the input information by a user interface (UI) on the Web page which is written by receiving the notification from the document file output apparatus 1c, the server apparatus 5 transmits the obtained information to the document file output apparatus 1c. Further, the document file output apparatus 1c may include the main server function and the Web server function of the server apparatus 5.

Similar to Embodiment 1, a personal computer is used for the document file output apparatus 1c according to Embodiment 3. The document file output apparatus 1c includes a control unit 10c, a storage unit 11c, a temporary storage unit 12, an input/output unit 13, a communication unit 14, a reading unit 15, and a display unit 20. The control unit 10c executes each processing to be described below based on the document file output program 1Pc which is stored in the storage unit 11c.

The display unit 20 is a monitor of the document file output apparatus 1c using, for example, a liquid crystal panel, and displays an UI screen based on an instruction from the control unit 10c.

The document file output apparatus 1c may communicate with the server apparatus 5 through the communication unit 14. The control unit 10c transmits the written mail to the server apparatus 5 by the communication unit 14 and may perform a notification to be transmitted to a destination. Further, the control unit 10c accesses the server apparatus 5 through the communication unit 14 to be able to perform a notification requesting the writing of the Web page and receive the input information from the server apparatus 5 to the Web page.

Figure 17:
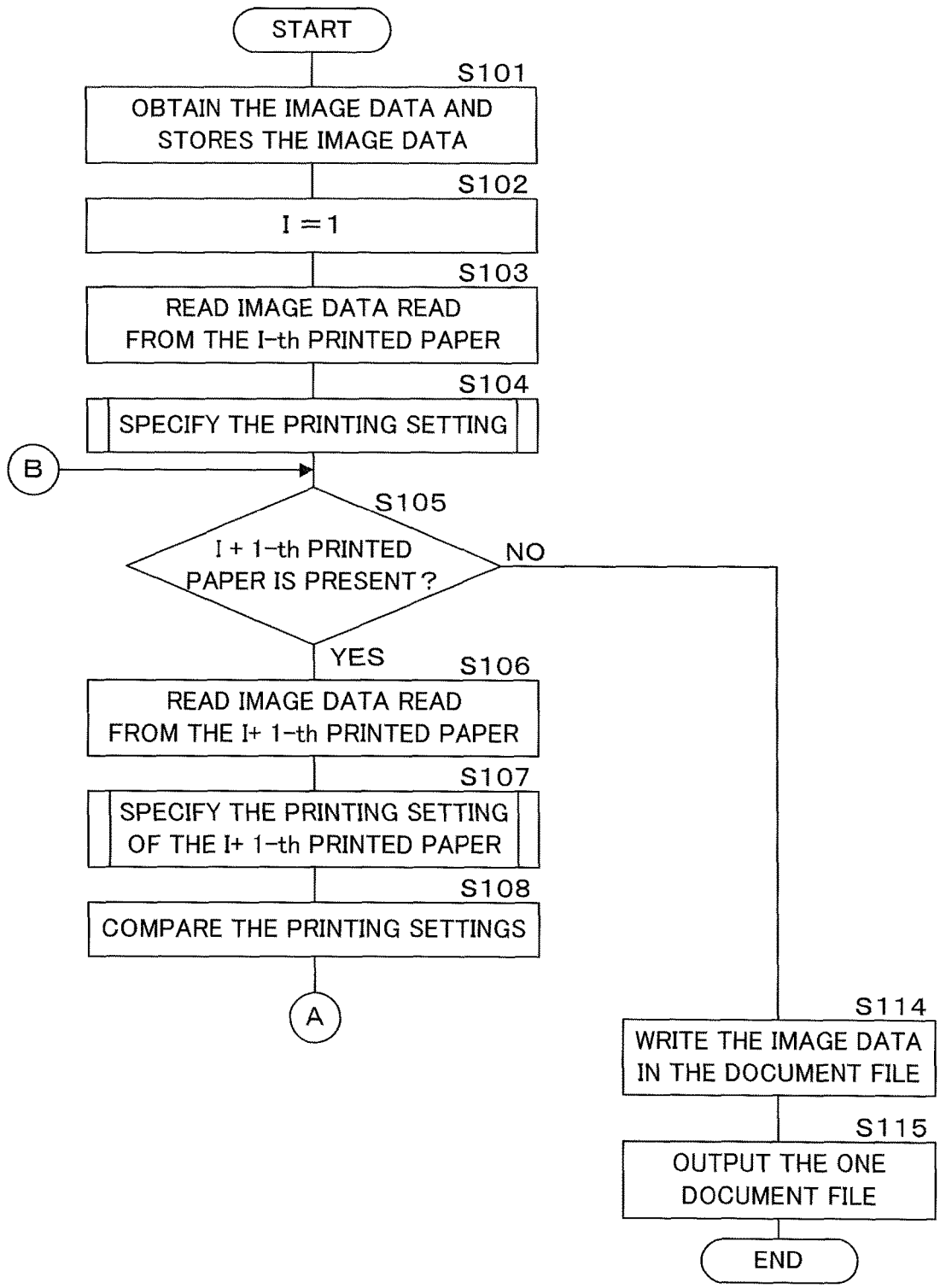
FIG. 17 is a flow chart illustrating an example of a processing procedure executed by a control unit of a document file output apparatus according to Embodiment 3.
Figure 18:
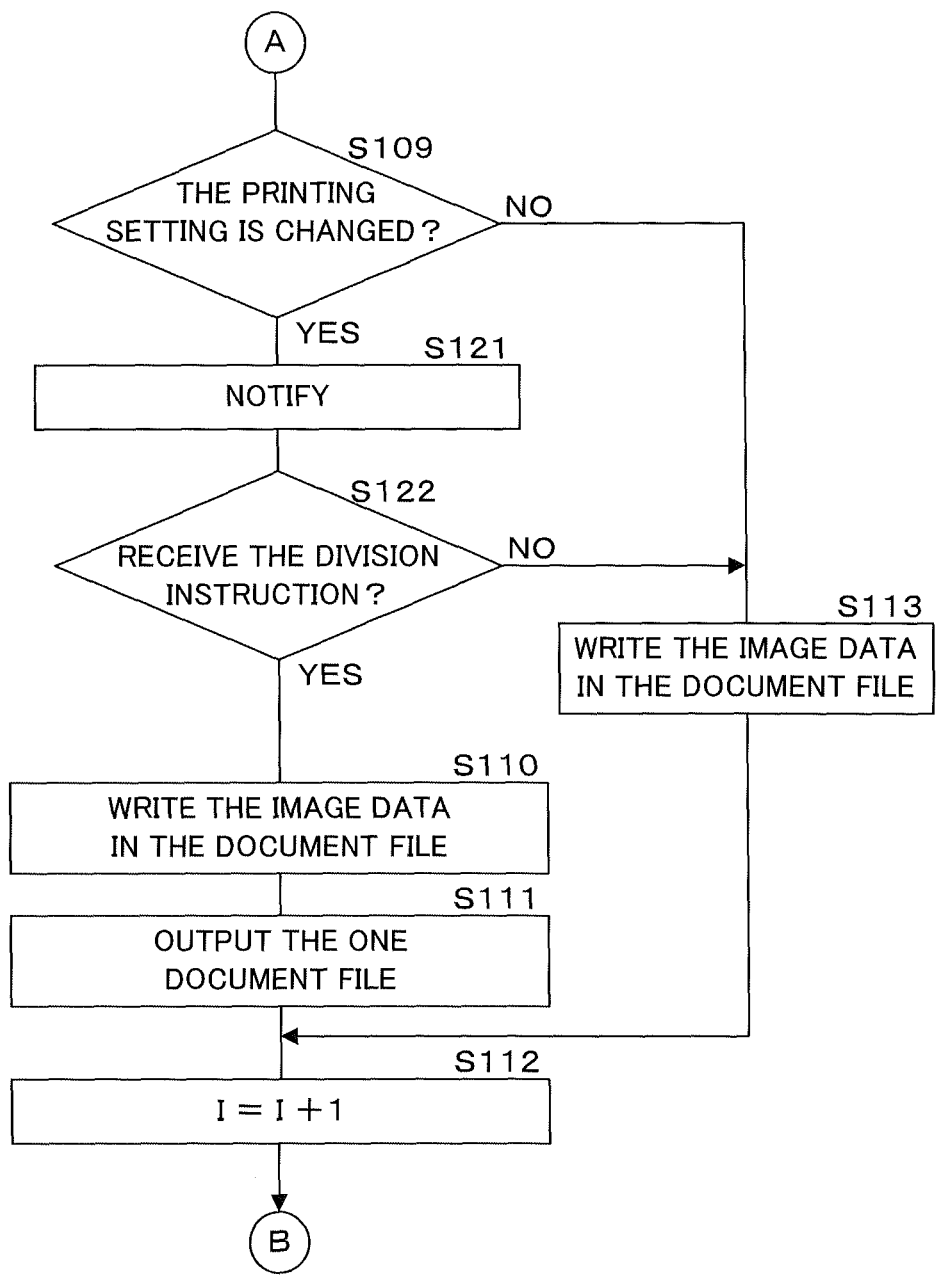
FIG. 18 is a flow chart illustrating an example of a processing procedure executed by the control unit of the document file output apparatus according to Embodiment 3.

FIGS. 17 and 18 are flow charts illustrating an example of the processing procedure performed by the control unit 10c of the document file output apparatus 1c according to Embodiment 3. In the following flow chart, the procedure common to the processing procedure illustrated in the flow chart of FIG. 3 according to Embodiment 1 is denoted by the same step number and a detailed description thereof will be omitted.

The control unit 10c of the document file output apparatus 1c, serves as the image data obtaining unit 16 and the printing setting specification unit 17, and performs the processing, to specify the printing setting of the image data obtained from the reading apparatus 3 one by one, and compare the printing settings before and after the specified printing setting (S101 to S108).

Further, when it is determined that the printing setting is changed (YES in S109), the control unit 10c notifies the user (step S121). In this case, the control unit 10c displays the UI screen for confirmation as the notification means to the user on the display unit 20. In this case, the UI screen includes the image data of the I-th or I+1-th printed paper, if it is determined that the printing setting is changed, and thus the user can confirm the divided place. Alternately, the control unit 10c writes the UI screen for confirmation, and a mail attached with the image data for a printed paper for confirmation, as the notification means to the user. In this case, the destination of the mail may receive a specific address stored in the storage unit 11c or a corresponding address from authorized information, and the like of a user who executes reading using the reading apparatus 3. The control unit 10c transmits the mail written as the notification means to the server apparatus 5 and transmits it to a terminal apparatus of the destination by the mail server function thereof. Alternately, the control unit 10c requests the Web server function of the server apparatus 5 of the UI screen for confirmation, and the writing of the Web page attached with the image data for a printed paper for confirmation, as the notification means to the user. Further, the control unit 10c notifies the user of the address information for accessing the written Web page by a mail or messenger function.

The control unit 10c determines whether an instruction to divide the file is received as the acceptance notification from the user (step S122). In detail, the control unit 10c determines whether to receive the division instruction, based on whether the input button, of the division instruction on the UI screen displayed on the display unit 20, is selected via input devices such as a keyboard and a mouse, which are not illustrated. Alternately, the control unit 10c may determine whether to receive the division instruction based on whether to receive a response indicating the division instruction of the transmitted mail when transmitting the mail. Further, the control unit 10c may determine whether to receive the division instruction based on the input information on the UI screen of the Web page written by the Web server function of the server apparatus 5.

When the control unit 10c determines that the division instruction is received in step S122 (YES in step S122), the control unit 10c writes the image data of the I-th printed paper in the document file to be output (S110). Next, the control unit 10c brings one document file to completion up to the I-th image data, closes the file and output the file (S111).

When the control unit 10c determines that the printing setting is not changed in step S122 (NO in S122), the control unit 10 writes the image data of the I-th printed paper in the document file to be output, by using the function of the division output unit 19 (S113), and progresses the processing to step S112. In this case, for the division instruction on the UI screen displayed on the display unit 20, when the NO button is selected via the input devices such as the keyboard and the mouse, which are not illustrated, the control unit 10c determines that the division instruction is not received. Alternately, if the control unit 10c does net detect that the division instruction input button is pressed even when a prescribed time (for example, 1 minute) lapses, the control unit 10c may determine that the division instruction is not received. Further, when the control unit 10c does not receive a response to the transmitted mail even when a prescribed time lapse or if there is no access to the Web page or the input information is not present, the control unit 10c may determine that the division instruction is not received.

As described in Embodiment 3, when the control unit 10c determines that the printing setting is changed, the control unit 10c issues a notification to urge for the division instruction to a user for confirmation, thereby preventing the file from being divided by mistake. Thereby, the document file output apparatus 1c outputs the image data as different document files at the place where the printing setting needs to be actually changed or divided, after the user seeing divided position, and therefore the user may avoid an unnecessary division or a wrong division.

Embodiment 4

According to Embodiment 4, a document file output apparatus 1d has a configuration in which the document files of the same printing setting are combined when the number of document files to be output is large.

Figure 19:
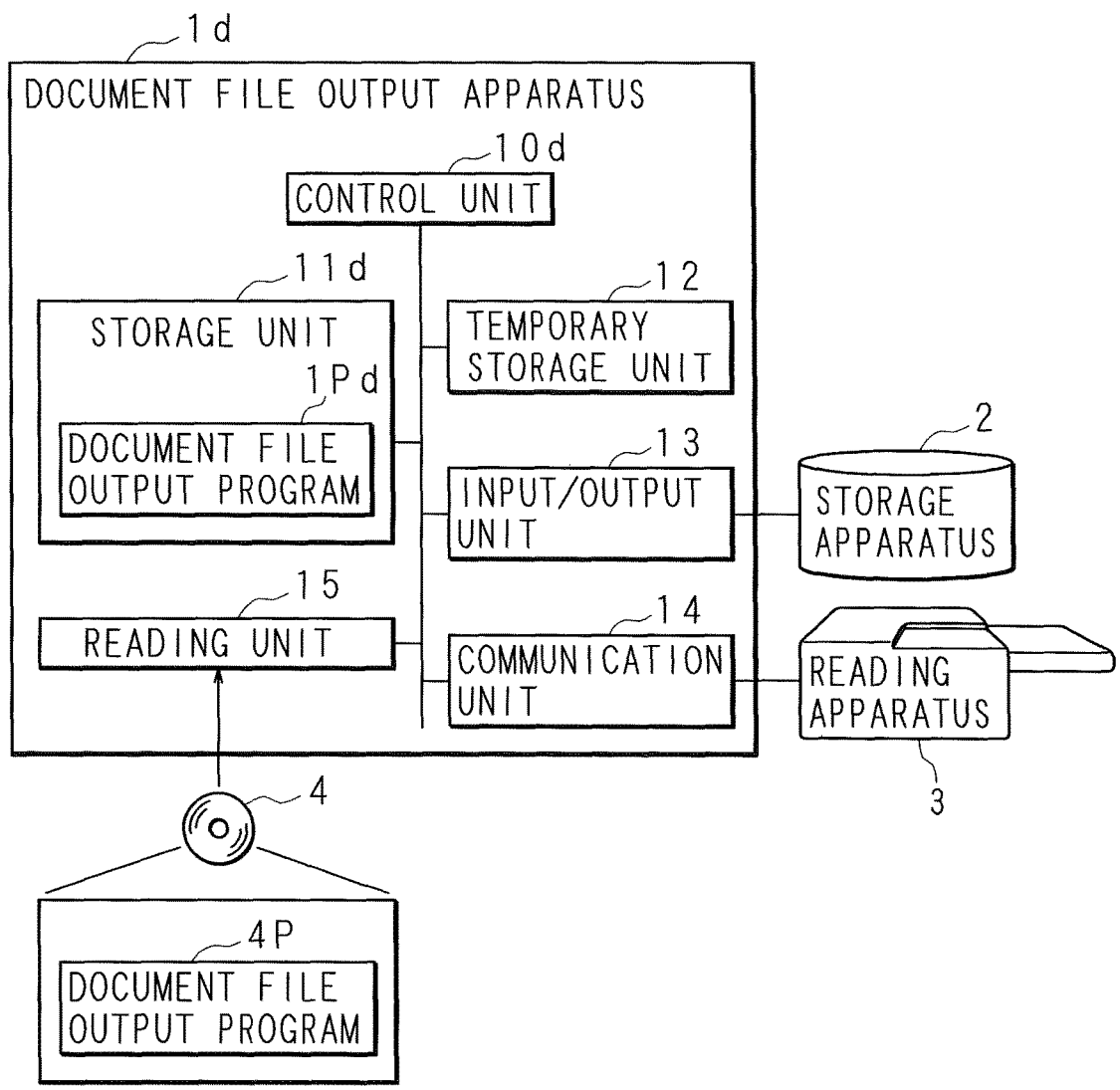
FIG. 19 is a block diagram illustrating a configuration of a document file output system according to Embodiment 4.

FIG. 19 is a block diagram illustrating a configuration of a document file output system according to Embodiment 4. The document file output system according to Embodiment 4 includes the document file output apparatus 1d, a storage apparatus 2, and a reading apparatus 3. The configuration of the document file output system according to Embodiment 4 is the same as the configuration according to Embodiment 1 other than adding of the document file combining processing by the document file output apparatus 1d. Therefore, the components having function common to Embodiment 1 are denoted by the same reference numerals and a detailed description thereof will be omitted.

Similar to Embodiment 1, a personal computer is user for the document file output apparatus 1d. The document file output apparatus 1d includes the control unit 10d, a storage unit 11d, a temporary storage unit 12, an input/output unit 13, a communication unit 14, and a reading unit 15. The control unit 10b implements each function to be described below based on the document file output program 1Pd which is stored in the storage unit 11d.

Figure 20:
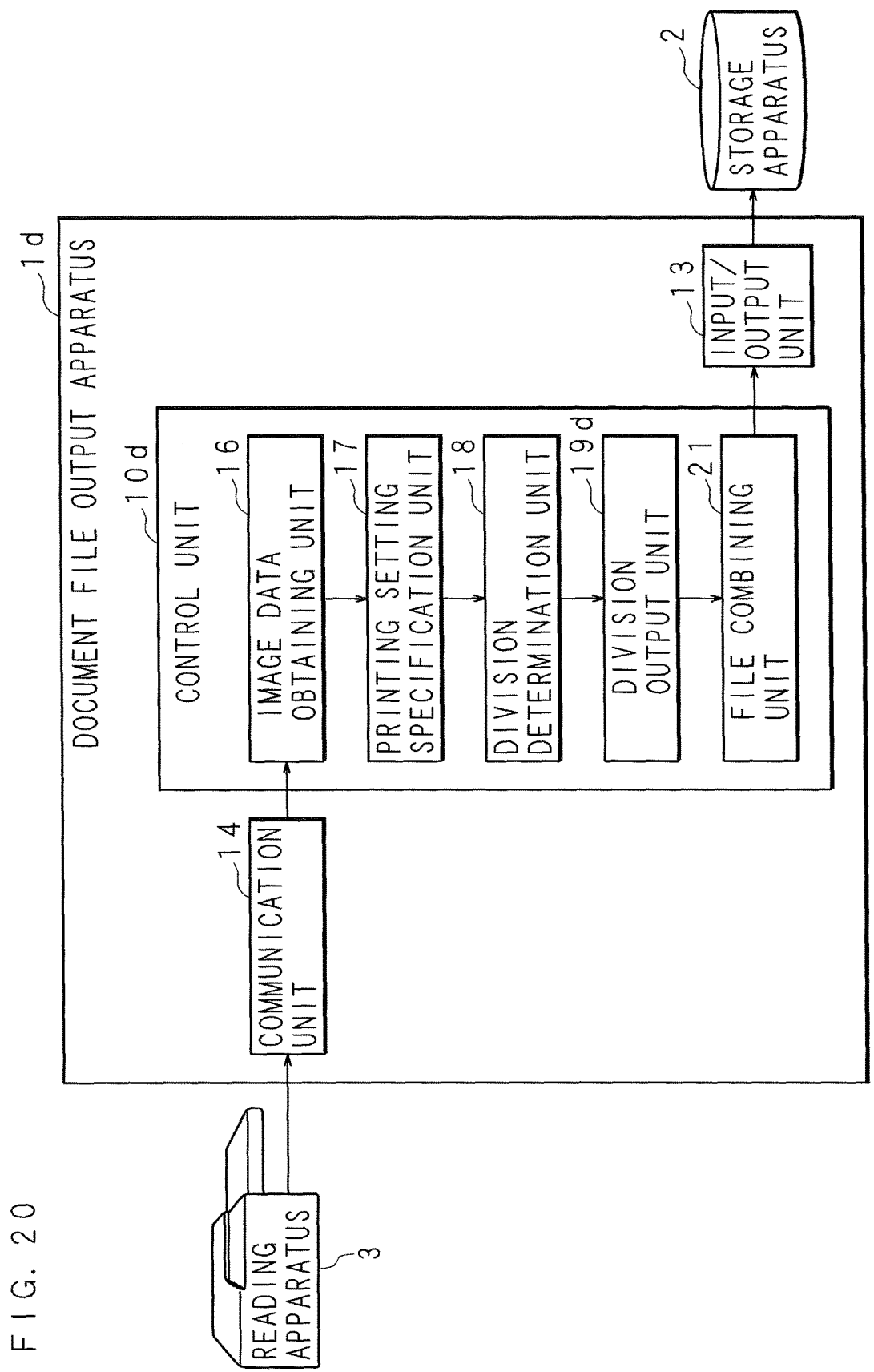
FIG. 20 is a functional block diagram illustrating a function which is implemented in a document file output apparatus according to Embodiment 4.

FIG. 20 is a functional block diagram illustrating a function which is implemented in the document file output apparatus 1d according to Embodiment 4. The control unit 10d of the document file output apparatus 1d according to Embodiment 4 reads and executes the document file output program 1Pd which is stored in the storage unit 11d and serves as the image data obtaining unit 16, the printing setting specification unit 17, the division determination unit 18, and the division output unit 19d similar to Embodiment 1 and serves as a file combining unit 21. Further, each component may be implemented in hardware as a specific integrated circuit.

The control unit 10d serves as the division output unit 19d and stores the file after the division in the storage unit 11d as one document file. During this process, the information, identifying the printing setting for which it is determined that the setting is changed when the document file is divided, is stored in the storage unit 11d, along with the file. Further, the control unit 10d serves as the file combining unit 21 to partially combine the document file output by the function of the division output unit 19 based on the identifying information of the printing setting which is stored in the storage unit 11d. The document file output apparatus 1d outputs each document file after being divided and partially combined from the input/output unit 13 to the storage apparatus 2.

Figure 21:
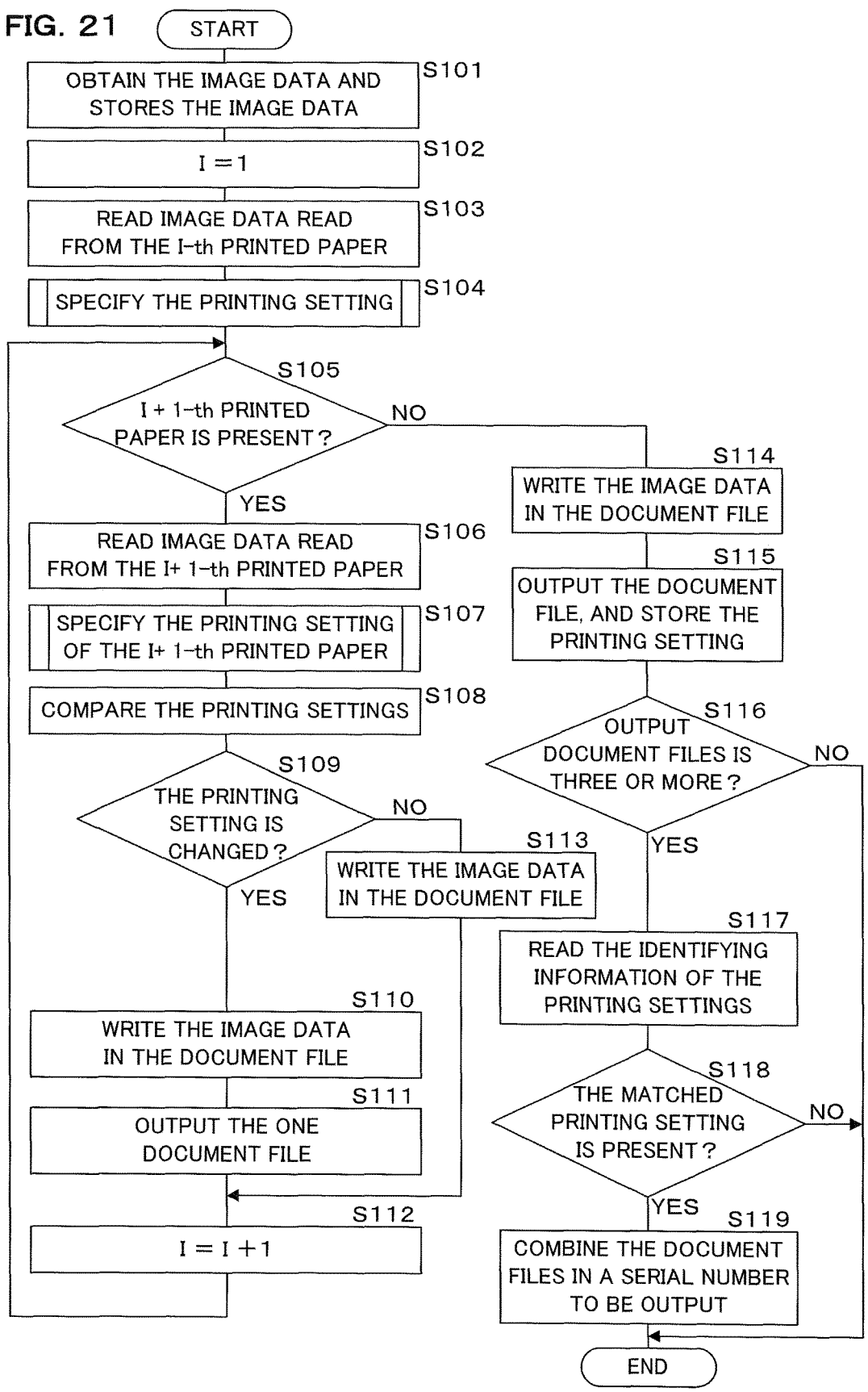
FIG. 21 is a flow chart illustrating an example of a processing procedure executed by a control unit of the document file output apparatus according to Embodiment 4.

FIG. 21 is a flow chart illustrating an example of the processing procedure executed by the control unit 10d of the document file output apparatus 1d according to Embodiment 4. In the following flow chart, the procedure common to the processing procedure illustrated in the flow chart of FIG. 3 according to Embodiment 1 is denoted by the same step number and a detailed description thereof will be omitted.

The control unit 10d of the document file output apparatus 1d, serves as the image data obtaining unit 16, the printing setting specification unit 17, and the division determination unit 18, and performs the processing, to specify the printing setting of the image data obtained from the reading apparatus 3 one by one, and compare the printing settings before and after the specified printing setting. In this case, when it is determined that the printing setting is changed, the control unit performs a control to output by dividing the document file (S101 to S115).

In this case, when the control unit 10d of the document file output apparatus 1d outputs the document file in steps S111 and S115, the control unit 10d stores the printing setting specified for the I-th printed paper in step S107 in the storage unit 11d by using the function of the division output unit 19d in association with the document file to be output.

Further, the control unit 10d performs the dividing processing of the document file by using the function of the file combining unit 21 and then determines whether the number of output document files stored in the storage unit 11d is three or more (step S116). Further, the number of document files is not limited to three but may be four or more.

If the control unit 10d determines that the number of document files is three or more (YES in step S116), the control unit 10d reads the identifying information of the printing setting which is stored in association with each document file (step S117). The control unit 10d determines whether the same or same kind of printing setting and the matched printing setting is present, based on the identification information of the read printing setting (step S118). When the control unit 10d determines that the matched printing setting is present (YES in S118), the control unit 10d combines the document files which are stored, in association with the matched printing setting, in a serial number to be output (step S119) and ends the processing as it is.

When the control unit 10d determines that the number of the document file is two or less (NO in S116), the control unit 10d ends the processing as it is. Further, when the control unit 10d determines that the matched printing setting is not present in step S118 (NO in S118), the control unit 10d ends the processing as it is without combining the files.

As described in Embodiment 4, the control unit 10d executes the dividing processing and then executes the processing, to combine the document files of the matched printing setting, to output the image data of the read printed paper having 4 pages per sheet as one document file. Further, the image data of the printed paper having the same slip format is output as one document file. Thereby, since the image data read from printed paper having the same printing setting which are scattered in the plurality of read printed papers is collected into one, it can avoid unnecessarily outputting numerous document files.

The foregoing Embodiments 1 and 4 may be combined with each other to implement various functions.

As this description may be embodied in several forms without departing from the spirit of essential characteristics thereof, the present embodiment is therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

The invention claimed is:

1. A document file output apparatus comprising:
    a controller; wherein
    the controller obtains a plurality of image data continuously read from a plurality of printed materials having characters or graphics, in read order;
    the controller specifies a number of pages included on each read printed material by scanning pixels of the plurality of image data;
    the controller determines whether a number of pages included on one read printed material is different from a number of pages included on a read printed material before or after the one read printed material by comparing the number of pages included on the one read printed material with the number of pages included on the read printed material before or after the one read printed material; and
    the controller outputs the image data of read printed materials before or after the one read printed material as one document file when the controller determines that the number of pages included on the one read printed material is different from the number of pages included on the read printed material before or after the one read printed material.

2. The document file output apparatus according to claim 1, wherein
    the controller determines whether the number of pages included on the one read printed material is different from the number of pages included on the read printed material before the one read printed material by comparing the number of pages included on the one read printed material with the number of pages included on the read printed material before the one read printed material in read order, and
    the controller outputs the image data of the read printed materials before the one read printed material as one document file when the controller determines that the number of pages included on the one read printed material is different from the number of pages included on the read printed material before the one read printed material.

3. The document file output apparatus according to claim 1, wherein
    the controller determines whether the number of pages included on the one read printed material is different from the number of pages included on the read printed material after the one read printed material by comparing the number of pages included on the one read printed material with the number of pages included on the read printed material after the one read printed material in reverse read order, and the controller outputs the image data of the read printed materials after the one read printed material as one document file when the controller determines that the number of pages included on the one read printed material is different from the number of pages included on the read printed material after the one read printed material.

4. The document file output apparatus according to claim 1, wherein the controller extracts pixels corresponding to a region having characters or graphics printed in an image based on an obtained image data for each of the plurality of image data;

the controller calculates a distribution of appearance frequency of pixels extracted in a first direction of the image, a second direction of the image, or in both the first and the second directions of the image;

the controller specifies a region having high appearance frequency by comparing an appearance frequency of a central part of the image with that of another part of the image; and the controller specifies the number of pages included on each read printed material based on a number of specified regions and each area of the specified regions.

5. The document file output apparatus according to claim 1, wherein:

the controller extracts document files composed of image data of read printed material having a same number of pages on each read printed material as each other and outputs the document files; and the controller combines the extracted document files into one document file.

6. A document file output method comprising the steps of:

obtaining a plurality of image data continuously read from a plurality of printed materials having characters or graphics, in read order;

specifying a number of pages included on each read printed material by scanning pixels of the plurality of image data;

determining whether a number of pages included on one read printed material is different from a number of pages included on a read printed material before or after the one read printed material by comparing the number of pages included on the one read printed material with the number of pages included on the read printed material before or after the one read printed material; and outputting the image data of read printed materials before or after the one read printed material as one document file when it is determined that the number of pages included on the one read printed material is different from the number of pages included on the read printed material before or after the one read printed material.

7. A non-transitory computer readable medium storing a computer program causing a computer to output document files, the computer program causing the computer to perform a method comprising the steps of:

obtaining a plurality of image data continuously read from a plurality of printed materials having characters or graphics, in read order;

specifying a number of pages included on each read printed material by scanning pixels of the plurality of image data;

determining whether a number of pages included on one read printed material is different from a number of pages included on a read printed material before or after the one read printed material by comparing the number of pages included on the one read printed material with the number of pages included on the read printed material before or after the one read printed material; and outputting the image data of read printed materials before or after the one read printed material as one document file when it is determined that the number of pages included on the one read printed material is different from the number of pages included on the read printed material before or after the one read printed material.

* * * * *